(12) United States Patent
Tien

(10) Patent No.: US 12,254,139 B2
(45) Date of Patent: Mar. 18, 2025

(54) PERIPHERAL KEYBOARD AND STAND APPARATUS FOR A TABLET COMPUTER

(71) Applicant: Ming-Tsong George Tien, Cupertino, CA (US)

(72) Inventor: Ming-Tsong George Tien, Cupertino, CA (US)

(*) Notice: Subject to any disclaimer, the term of this patent is extended or adjusted under 35 U.S.C. 154(b) by 262 days.

(21) Appl. No.: 18/179,645

(22) Filed: Mar. 7, 2023

(65) Prior Publication Data

US 2024/0302906 A1 Sep. 12, 2024

(51) Int. Cl.
*G06F 3/02* (2006.01)
*G06F 1/16* (2006.01)
*G06F 3/023* (2006.01)

(52) U.S. Cl.
CPC .......... *G06F 3/0208* (2013.01); *G06F 1/1667* (2013.01); *G06F 1/1681* (2013.01); *G06F 3/0231* (2013.01)

(58) Field of Classification Search
CPC .... G06F 3/0231; G06F 1/1681; G06F 1/1667; G06F 3/0208
See application file for complete search history.

(56) References Cited

U.S. PATENT DOCUMENTS

| | | | |
|---|---|---|---|
| 10,491,727 B1 * | 11/2019 | Liu | H04M 1/04 |
| 10,827,827 B1 * | 11/2020 | Failing | A47B 21/03 |
| 10,890,944 B1 * | 1/2021 | Tien | G06F 1/1666 |
| 2015/0034893 A1 * | 2/2015 | Bacon | B66F 3/46 |
| | | | 254/290 |
| 2017/0000254 A1 * | 1/2017 | Matlin | A47B 9/10 |

* cited by examiner

*Primary Examiner* — Imani N Hayman
*Assistant Examiner* — Josiah A Castillo
(74) *Attorney, Agent, or Firm* — Parsons & Goltry, PLLC; Michael W. Goltry; Robert A. Parsons

(57) ABSTRACT

A keyboard and stand assembly includes a keyboard configured with a trigger and a power drive mechanism, and a linkage coupled between a tablet computer holder and the keyboard, the power drive mechanism coupled operatively between the trigger and the linkage, wherein selective actuation of the trigger automatically activates the power drive mechanism, extending and retracting the linkage for raising and lowering the holder relative to the keyboard.

26 Claims, 39 Drawing Sheets

PERIPHERAL KEYBOARD AND STAND APPARATUS FOR A TABLET COMPUTER

FIELD OF THE INVENTION

The present invention relates to peripheral keyboards for tablet computers and, more particularly, to a peripheral keyboard incorporating an extensible and retractable stand configured to receive and hold a tablet computer.

BACKGROUND OF THE INVENTION

A tablet computer, commonly referred to as a tablet, is a thin, flat mobile computer configured with an operating system, a processor, a touchscreen, and a rechargeable battery. The touchscreen is a display screen and a user interface, enabling the user to interact directly with what is displayed instead of using a mouse, touchpad, or another input device. Tablet computers do not have a physical keyboard and accept text and other input via the touchscreen, such as a virtual keyboard displayed by the touchscreen. Virtual keyboards are inherently cumbersome and difficult to use. Accordingly, tablet computers can connect to peripheral keyboards wirelessly or with a cable, enabling the user to use the physical keyboard as a text entry interface for typing text, numbers, and symbols into the tablet's application programs.

The consumer demand for tablet keyboards, peripheral keyboards specially adapted for use with tablets, is prevalent due to the popularity of tablets and the shortcomings of their virtual keyboards. Accordingly, skilled artisans have developed and improved keyboards specially adapted for tablets, small, portable keyboards configured with supports or stands designed to hold a tablet upright, enabling the user to view the tablet's touchscreen while he works the keyboard. However, current efforts have produced only partially acceptable results. For instance, known tablet keyboards are expensive and cumbersome. Further, the tablet supports or stands that some tablet keyboards incorporate are unreliable, fail to hold the tablet at an angle and height suitable to enable a user to view the tablet's touchscreen comfortably, and are difficult to adjust and manipulate. Given these and other deficiencies in the tablet keyboard field, the need for continued improvement is evident.

SUMMARY OF THE INVENTION

According to the invention, a peripheral keyboard and stand apparatus for a tablet computer includes a keyboard and a linkage. The keyboard includes a trigger and a power drive mechanism. The linkage is coupled between a tablet computer holder and the keyboard. The power drive mechanism is coupled operatively between the trigger and the linkage, wherein selective actuation of the trigger automatically activates the power drive mechanism, extending and retracting the linkage for raising and lowering the holder relative to the keyboard The keyboard is a wireless keyboard, being enabled to communicate with a tablet computer wirelessly. The keyboard includes a first keyboard component, a second keyboard component, and a housing. The first keyboard component and the second keyboard component are mounted to the housing, separating the first keyboard component from the second keyboard component. The first keyboard component is mounted to the housing for movement between an operative position and a stored position. The first keyboard component extends outward laterally from a first side of the housing when the first keyboard component is in its operative position. The first keyboard component extends upright from the first side of the housing and is juxtaposed with the linkage when the first keyboard component is in its stored position. The second keyboard component is mounted to the housing for movement between an operative position and a stored position. The second keyboard component extends outward laterally from a second side of the housing when the second keyboard component is in its operative position. The second keyboard component extends upright from the second side of the housing and is juxtaposed with the linkage when the second keyboard component is in its stored position. The tablet computer holder includes a central, main, primary, or first support and two auxiliary or secondary supports, namely, a second support and a third support. The first support is larger than the second and third supports, which are identical. The first support is mounted to the linkage and includes opposite sides, namely, a first side and a second side. A first arm supports the second support, and a second arm supports the third support. The first arm is mounted to the first support for movement between a stored position of the second support juxtaposed with the first support and a deployed position of the second support outboard of the first side of the first support. The second arm is mounted to the first support for movement between a stored position of the third support juxtaposed with the first support and a deployed position of the third support outboard of the second side of the first support. The first support, the second support, and the third support are each configured to secure a tablet computer magnetically. The first support is mounted to the linkage rotatably, enabling a user to rotate the tablet computer holder to different pitches or angles relative to the keyboard. The first support includes opposite ends, namely, a first end and a second end. The first side and the second side of the first support extend between the first support's first end and its second end. The second support is juxtaposed with and outboard of one of the first end and the second end of the first support when the second support is in the stored position thereof. The third support is juxtaposed with and outboard of one of the first end and the second end of the first support when the third support is the stored position thereof. In a particular embodiment, the second support and the third support are each juxtaposed with and outboard of one of the first end and the second end of the first support and are beside one another when the second support is in its stored position and the third support is in its stored position.

According to the invention, a peripheral keyboard and stand apparatus for a tablet computer includes a keyboard and a scissor mechanism. The keyboard includes a trigger and a power drive mechanism. The scissor mechanism is coupled between a tablet computer holder and the keyboard. The power drive mechanism is coupled operatively between the trigger and the scissor mechanism, wherein selective actuation of the trigger automatically activates the power drive mechanism, extending and retracting the linkage for raising and lowering the holder relative to the keyboard. The keyboard is a wireless keyboard, being enabled to communicate with a tablet computer wirelessly. The scissor mechanism includes multiple scissor supports, including a first scissor support and a second scissor support. The first scissor support has a first lower end of the scissor mechanism. The second scissor support has a second lower end of the scissor mechanism. The first scissor support includes a first or stationary lower end mounted to the housing at a fixed position and the second scissor support includes a movable or second lower end mounted to the housing for reciprocal movement relative to the first lower end. The power drive mechanism is coupled operatively between the trigger and the second lower end, wherein the selective actuation of the trigger automatically activates the power drive mechanism, reciprocating the second lower end relative to the first lower end extending and retracting the scissor mechanism. A shank mounted to the housing rotatably includes an external thread. The second lower end includes a pin including an internal thread threaded on the external thread, wherein rotation of the shank in opposite directions relative to the pin reciprocates the pin relative to the first lower end. The shank is coupled drivenly to the power drive mechanism, coupling the power drive mechanism operatively between the trigger and the second lower end, wherein the selective actuation of the trigger automatically activates the power drive mechanism, rotating the shank in opposite directions. The housing has a slot extending between a first end wall and a second end wall. The pin reciprocates through the slot between the first end wall and the second end wall in response to rotation of the shank in opposite directions. The power drive mechanism includes an electric motor. The keyboard includes a first keyboard component and a second keyboard component. The first keyboard component and the second keyboard component are mounted to the housing, separating the first keyboard component from the second keyboard component. The first keyboard component is mounted to the housing for movement between an operative position and a stored position. The first keyboard component extends outward laterally from a first side of the housing when the first keyboard component is in its operative position. The first keyboard component extends upright from the first side of the housing and is juxtaposed with the scissor mechanism when the first keyboard component is in its stored position. The second keyboard component is mounted to the housing for movement between an operative position and a stored position. The second keyboard component extends outward laterally from a second side of the housing when the second keyboard component is in its operative position. The second keyboard component extends upright from the second side of the housing and is juxtaposed with the scissor mechanism when the second keyboard component is in its stored position. The tablet computer holder includes a central, main, primary, or first support and two auxiliary or secondary supports, namely, a second support and a third support. The first support is larger than the second and third supports, which are identical. The first support is mounted to the scissor mechanism and includes opposite sides, namely, a first side and a second side. A first arm supports the second support, and a second arm supports the third support. The first arm is mounted to the first support for movement between a stored position of the second support juxtaposed with the first support, and a deployed position of the second support deployed outboard of the first side of the first support. The second arm is mounted to the first support for movement between a stored position of the third support juxtaposed with the first support, and a deployed position of the third support deployed outboard of the second side of the first support. The first support, the second support, and the third support are each configured to secure a tablet computer magnetically. The first support is mounted to the scissor mechanism by a coupling including a lower end coupled to the scissor mechanism and an upper end coupled to the first support. The lower end of the coupling is coupled rotatably to the scissor mechanism and the upper end of the coupling is coupled rotatably to the first support. The first support includes opposite ends, namely, a first end and a second end. The first side and the second side of the first support extend between the first support's first end and its second end. The second support is juxtaposed with and outboard of one of the first end and the second end of the first support when the second support is in the stored position thereof. The third support is juxtaposed with and outboard of one of the first end and the second end of the first support when the third support is the stored position thereof. In a particular embodiment, the second support and the third support are each juxtaposed with and outboard of one of the first end and the second end of the first support and are beside one another when the second support is in its stored position and the third support is in its stored position.

BRIEF DESCRIPTION OF THE DRAWINGS

Specific objects and advantages of the invention will be apparent to those skilled in the art from the following detailed description of illustrative embodiments thereof, taken in conjunction with the drawings in which.

DETAILED DESCRIPTION

Figure 1:
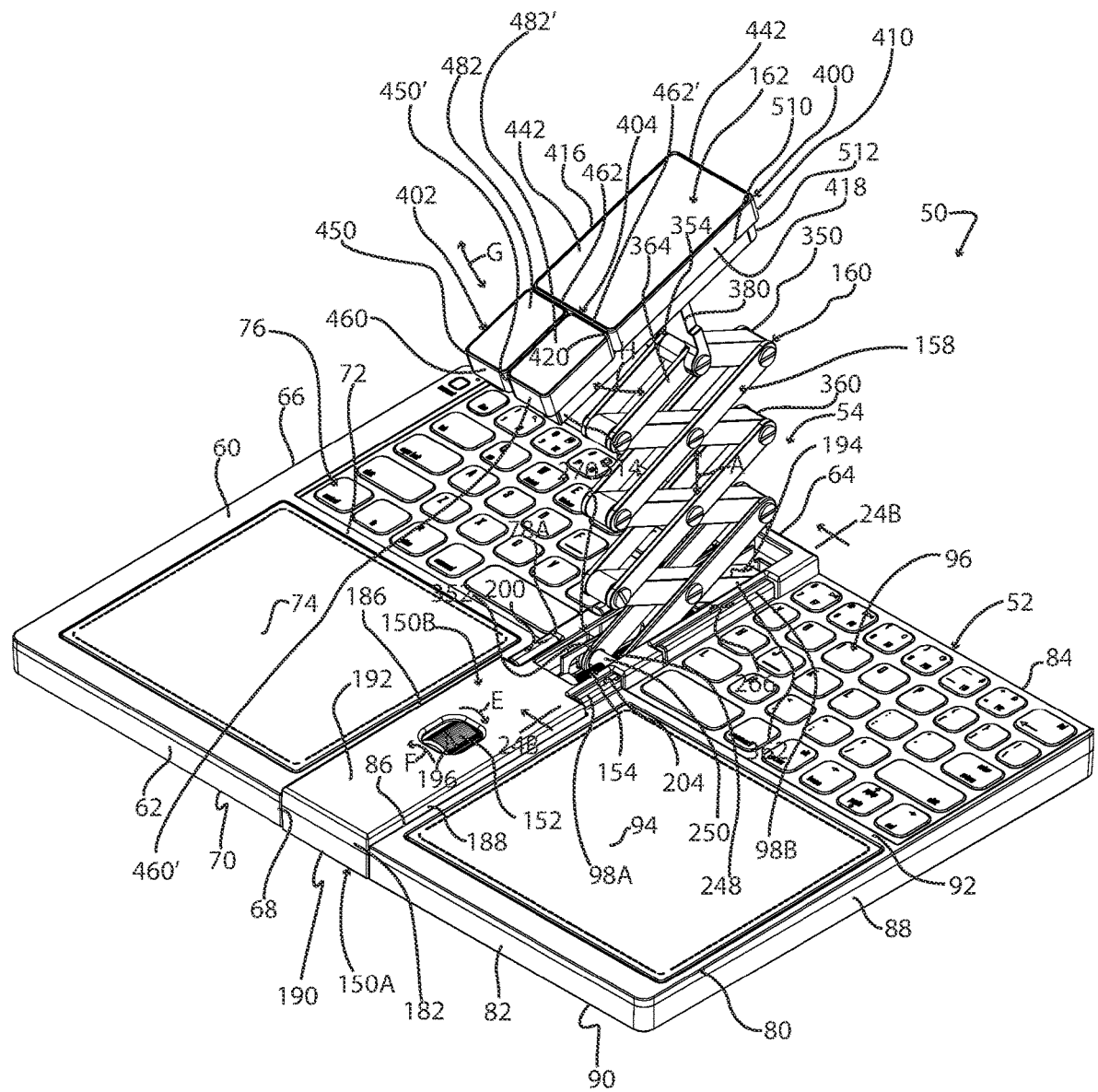
FIG. 1 is an upper right perspective view of a peripheral keyboard and stand apparatus for a tablet computer, the apparatus constructed and arranged in accordance with the invention and including a keyboard configured with a stand assembly including a housing configured with a trigger, a power drive mechanism, and an extensible and retractable stand including a linkage coupled between a tablet computer holder and the housing, the linkage extensible and retractable by the power drive mechanism for raising and lowering the holder over the keyboard in response to activation of the trigger, the linkage shown retracted and the holder shown lowered position over the keyboard and collapsed, the keyboard including a pair of keyboard components mounted to the respective sides of the housing for movement between respective operative positions, in which the keyboard components extend outward laterally from the respective sides of the housing, and respective stored positions, in which the keyboard components extend upright from the respective sides of the housing and are juxtaposed on either side of the linkage, the keyboard components shown in their operative positions.

Turning to the drawings, in which like reference characters indicate corresponding elements throughout the several views, FIG. 1 illustrates a peripheral keyboard and stand apparatus 50 for a tablet computer. The apparatus 50 includes a keyboard 52 configured with a stand assembly 54 configured to support a tablet computer at an elevated location over the keyboard 52, so a user may view it easily and comfortably while he uses the keyboard 52 to operate the tablet computer coupled conventionally to the keyboard 52 wirelessly or by a connecting wire. The keyboard 52 has standard short-range wireless technology and a standard plug outlet, enabling it to interface with the tablet computer wirelessly or by way of a wire appropriately plugged between the keyboard's 52 plug outlet and the tablet computer's corresponding plug outlet. The keyboard 52 works on direct current (DC) from its rechargeable battery and from a standard power converter that converts alternating current (AC) to DC when the user plugs the keyboard 52 into a standard electrical outlet and charges the battery at the same time.

The keyboard 52 is a split keyboard that splits the keys between two keyboard modules or components 60 and 80 on either side of the stand assembly 54 centered between the keyboard components 60 and 80. According to known techniques, the keyboard components 60 and 80 are linked wirelessly or by wiring. The keyboard component 60 is the first or left keyboard component, and the keyboard component 80 is the second or right keyboard component. The keyboard components 60 and 80 are generally coextensive, being generally the same size and shape as shown in the various figures.

Referring to FIGS. 1-4 and 6 in relevant part, the keyboard component 60 is flat and generally rectangular and includes opposite front and rear ends 62 and 64, opposite sides 66 and 68 extending between opposite front and rear ends 62 and 64, a lower side 70 and an upper side 72 configured with a wrist rest 74 and keys 76. Side 66 is the first, outer or left side of the keyboard component 60, and side 68 is the second, inner or right side of the keyboard component 60 coupled to the stand assembly 54. The wrist rest 74 is between the opposite sides 66 and 68 and between the front end 62 and the keys 76, which are between the opposite sides 66 and 68 and between the wrist rest 74 and the rear end 64. The keyboard component 60 has a length from the front end 62 to the rear end 64 that is longer than its width from side 66 to side 68.

Referring to FIGS. 1-6 in relevant part, the keyboard component 80 is, like keyboard component 60, flat and generally rectangular and includes opposite front and rear ends 82 and 84, opposite sides 86 and 88 extending between opposite front and rear ends 82 and 84, a lower side 90 and an upper side 92 configured with a wrist rest 94 and keys 96. Side 86 is the first or left side of the keyboard component 80, and side 88 is the second or right side of the keyboard component 80. The wrist rest 94 is between the opposite sides 86 and 88 and between the front end 82 and the keys 86, which are between the opposite sides 86 and 88 and between the wrist rest 94 and the rear end 84. The keyboard component 80 has a length from the front end 82 to the rear end 84 that is longer than its width from side 86 to side 88.

The keys 76 and 96 are the standard alphanumeric keys of a standard keyboard arrangement. The keyboard component's 60 wrist rest 74 is available to receive the palmar side of the user's left wrist while he types on the keys 76 with his left-hand fingers. The keyboard component's 80 wrist rest 94 is available to receive the palmar side of the user's right wrist while he types on the keys 96 with his right-hand fingers.

In FIGS. 1-7, the keyboard components 60 and 80 in their in-use or operative positions extend outward laterally from either side of the stand assembly 54 configured to support a tablet computer at an elevated location over the keyboard 52 so a user may view it easily and comfortably while he uses the keyboard 52 to work on the tablet computer. The wrist rest 74 and the keys 76 face upwardly on the left side of the stand assembly 54 in the in-use or operative position of the keyboard component 60. The wrist rest 94 and the keys 96 face upwardly on the right side of the stand assembly 54 in the in-use or operative position of the keyboard component 80. The upwardly-facing keyboard component's 60 wrist rest 74 is available to receive the palmar side of the user's left wrist while he types on the upwardly-facing keys 76 with his left-hand fingers to the left of the stand assembly 54. The keyboard component's 80 upwardly-facing wrist rest 94 is available to receive the palmar side of the user's right wrist while he types on the upwardly-facing keys 96 with his right-hand fingers to the right of the stand assembly 54.

Figure 7:
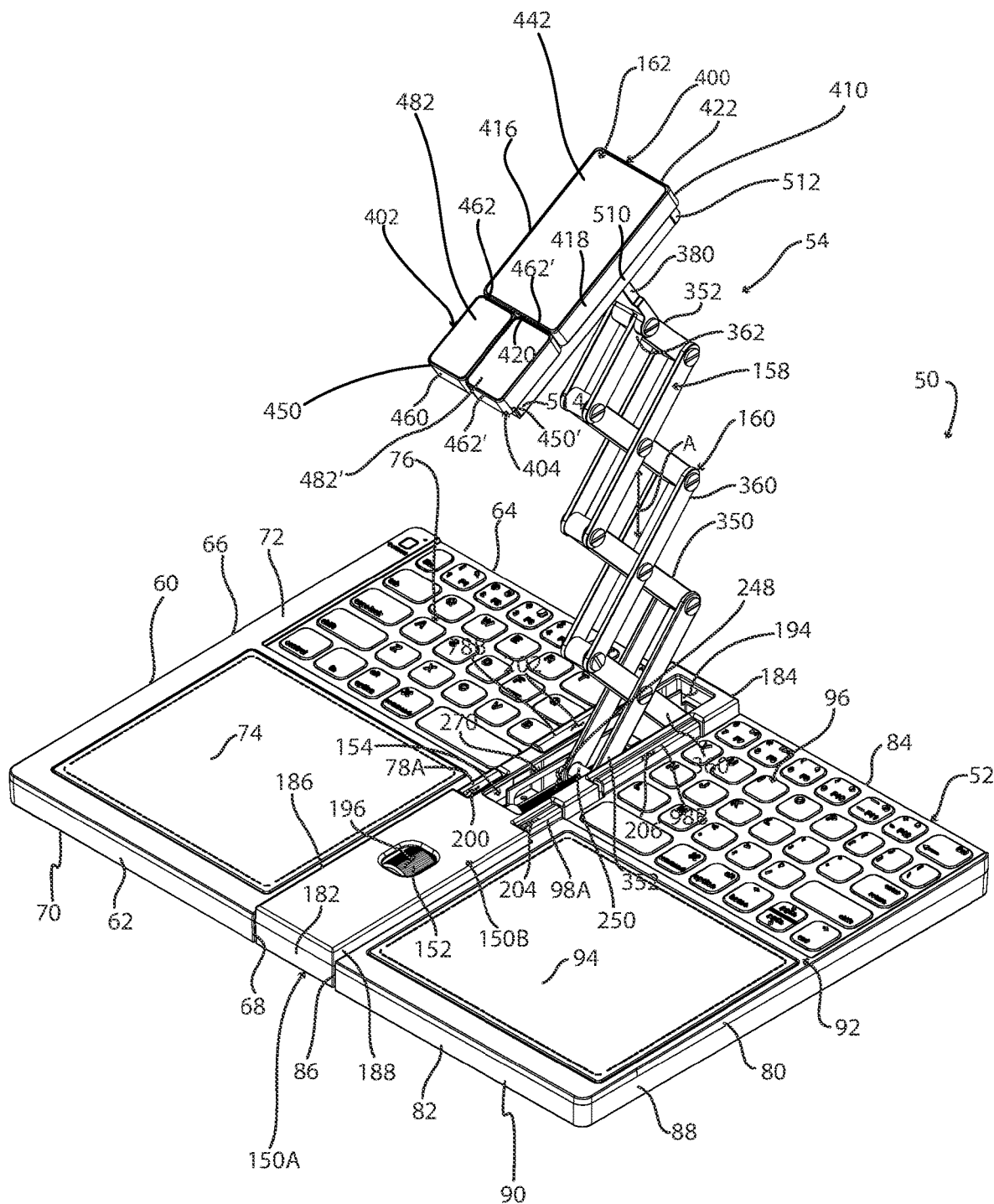
FIG. 7 is a view corresponding to FIG. 1, illustrating the linkage extended and the holder raised over the keyboard.
Figure 8:
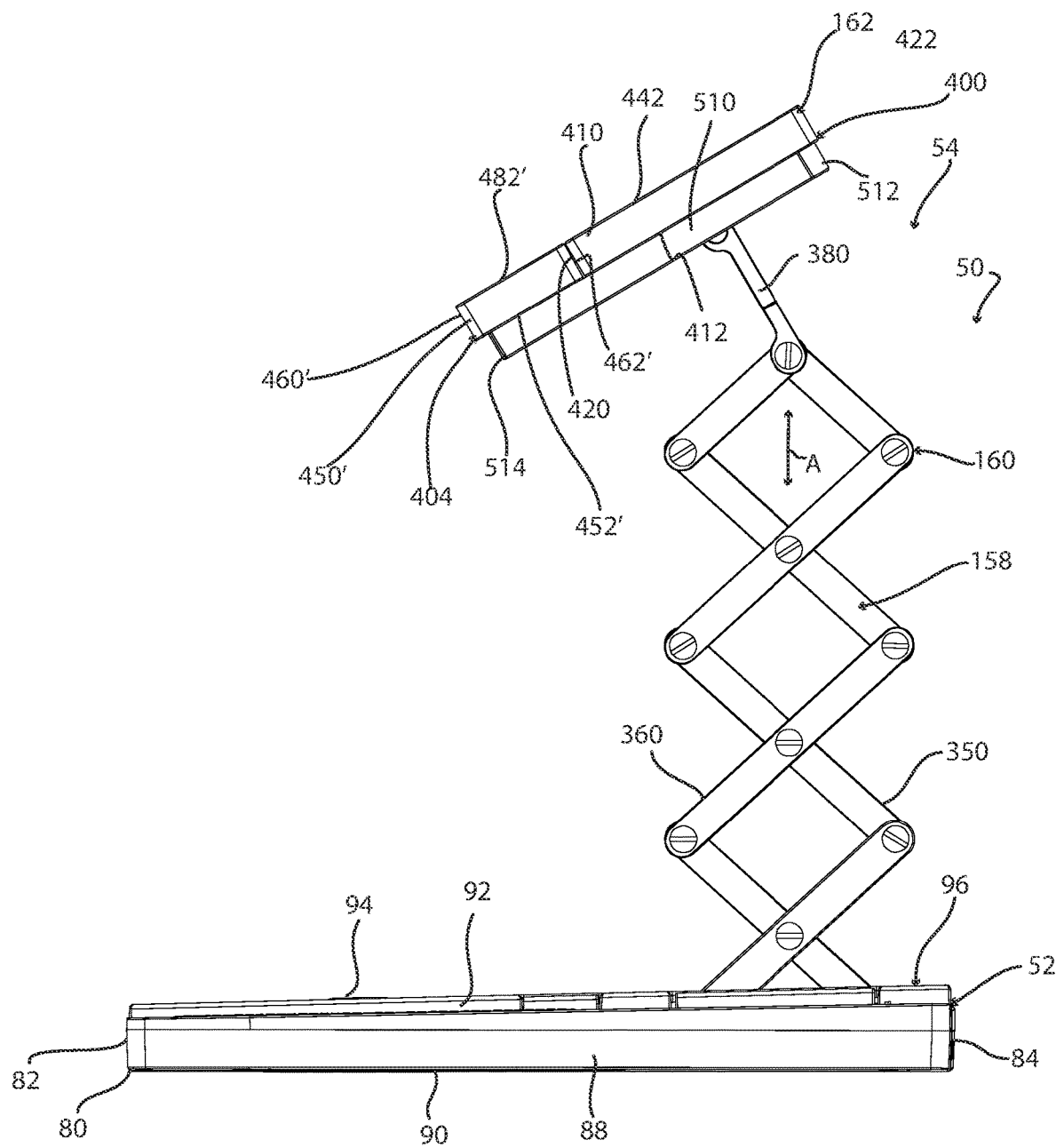
FIG. 8 is a right elevation view of the embodiment of FIG. 7, the left elevation view being substantially the same thereof.
Figure 9:
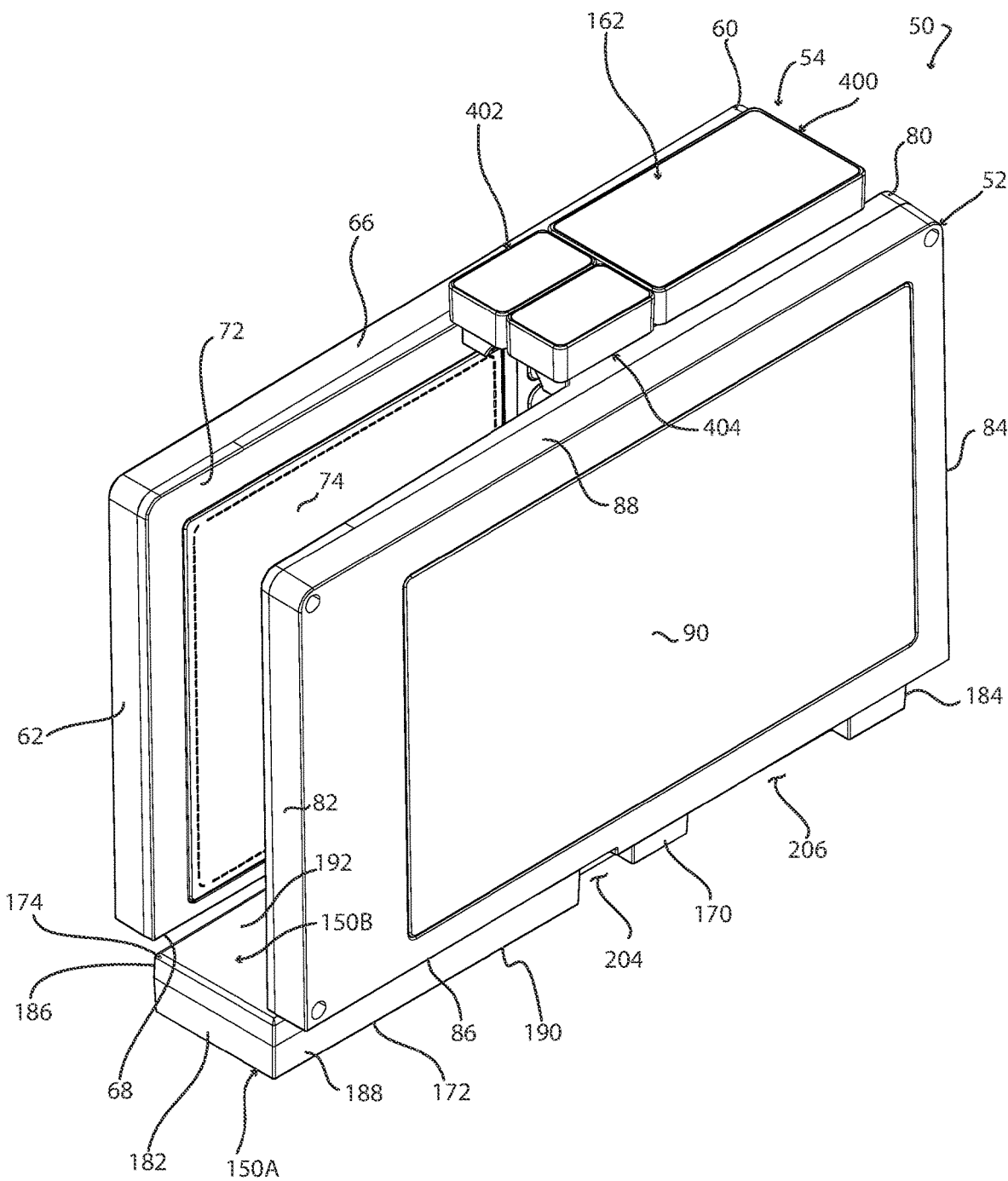
FIG. 9 is a view corresponding to FIG. 1, illustrating the keyboard components moved from their operative positions in FIG. 1 to their stored positions.
Figure 10:
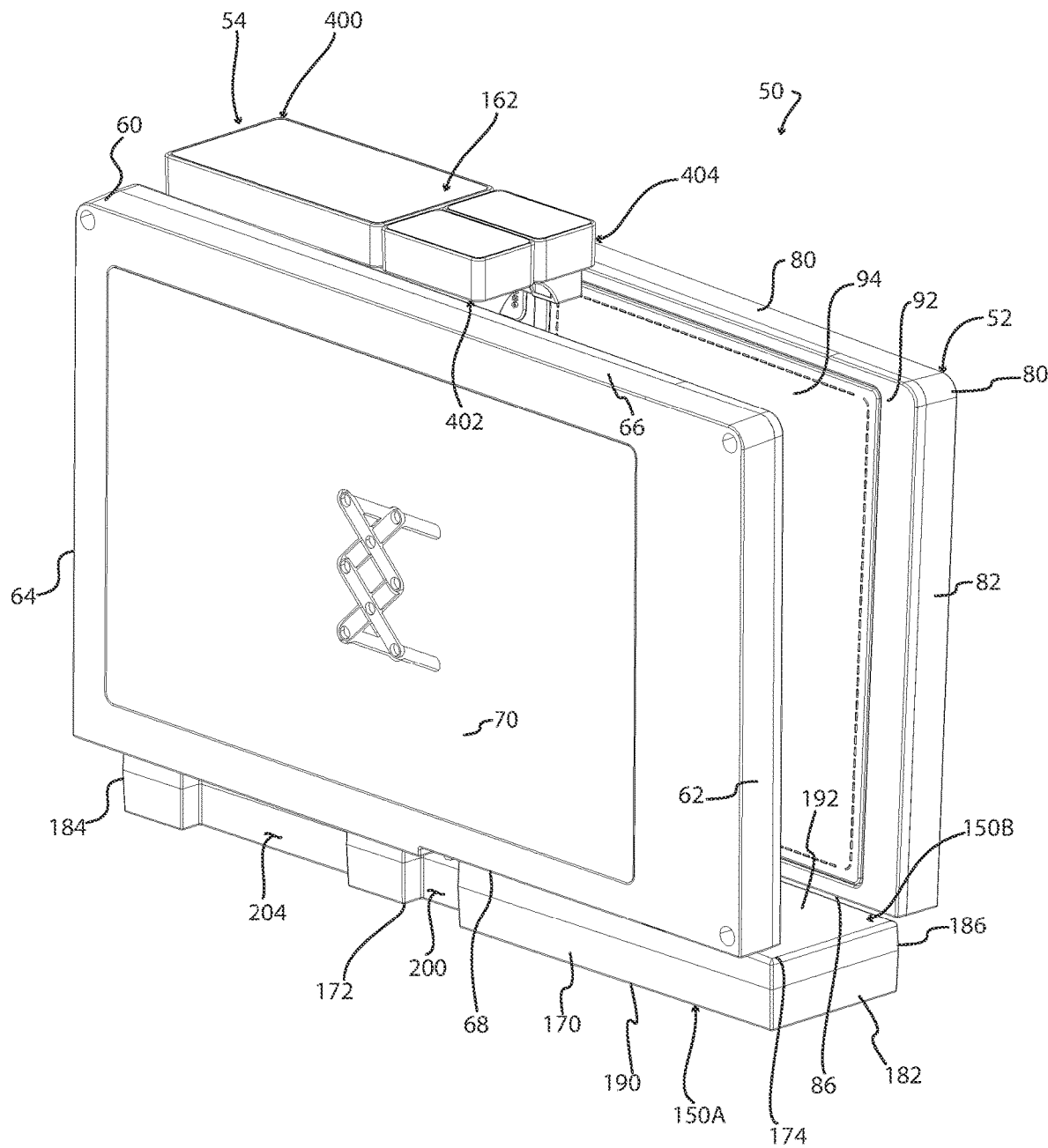
FIG. 10 is an upper left perspective view of the embodiment of FIG. 9.
Figure 11:
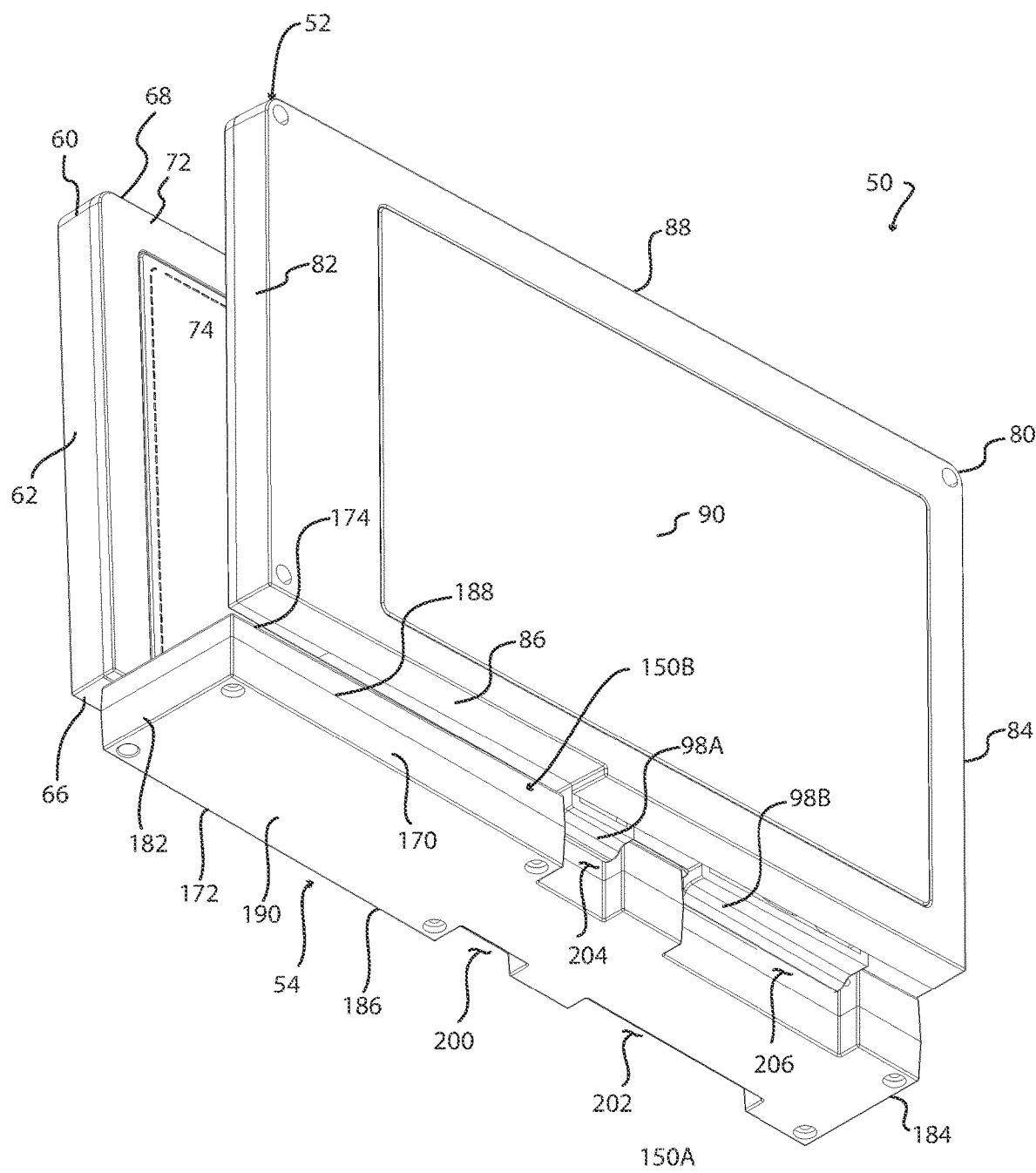
FIG. 11 is a lower right perspective view of the embodiment of FIG. 9.
Figure 12:
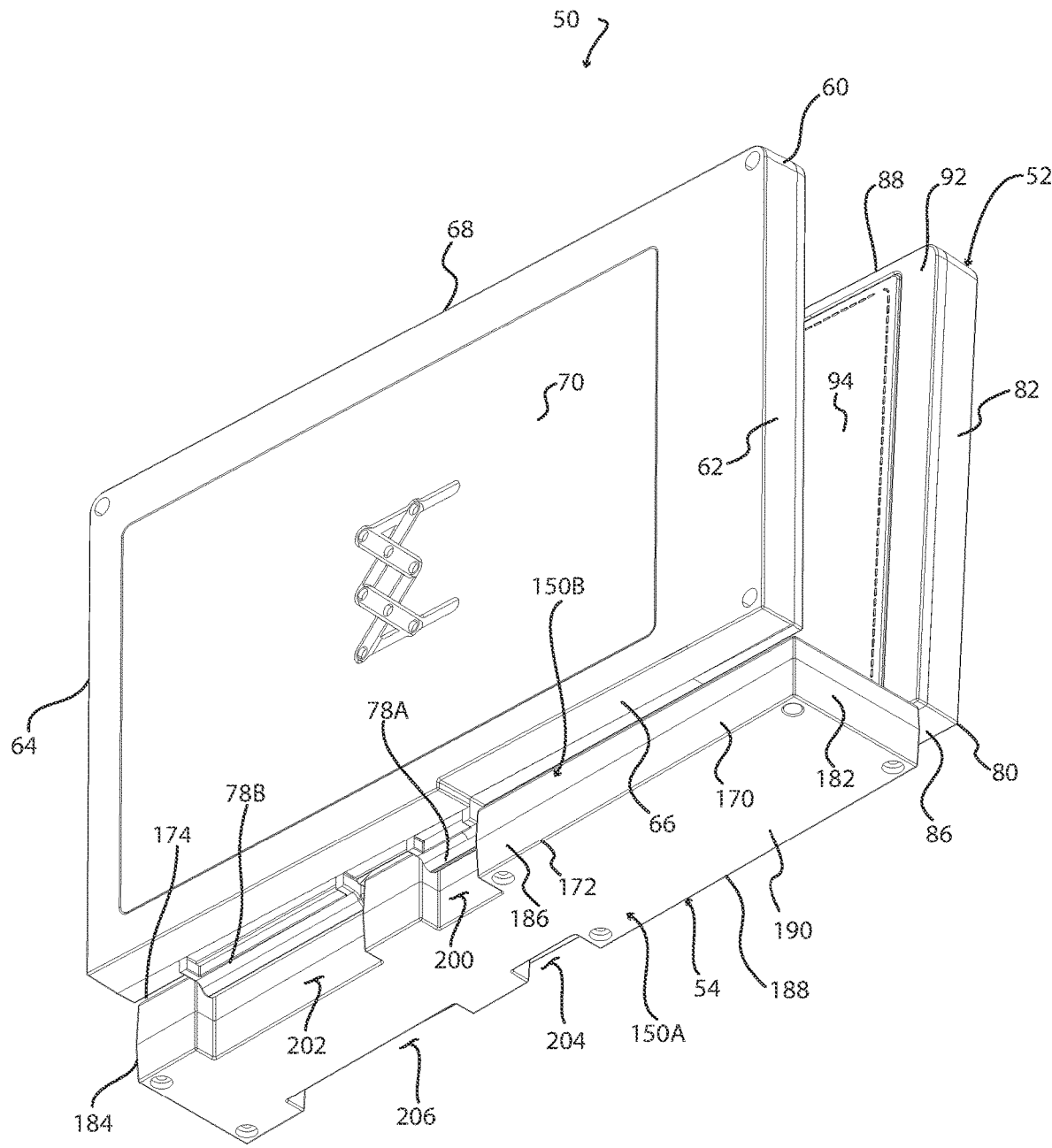
FIG. 12 is a lower left perspective view of the embodiment of FIG. 9.
Figure 13:
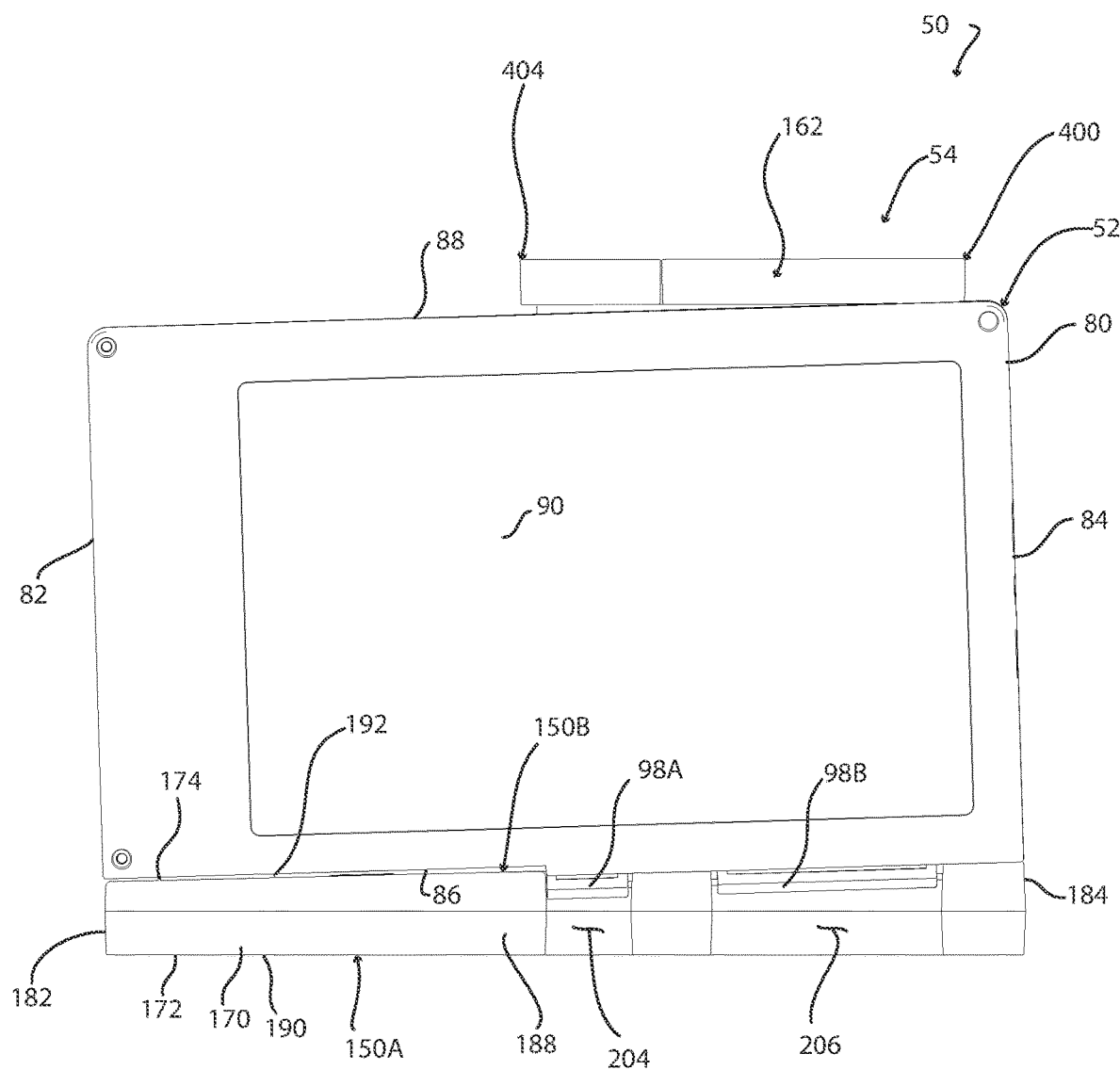
FIG. 13 is a right elevation view of the embodiment of FIG. 9.
Figure 14:
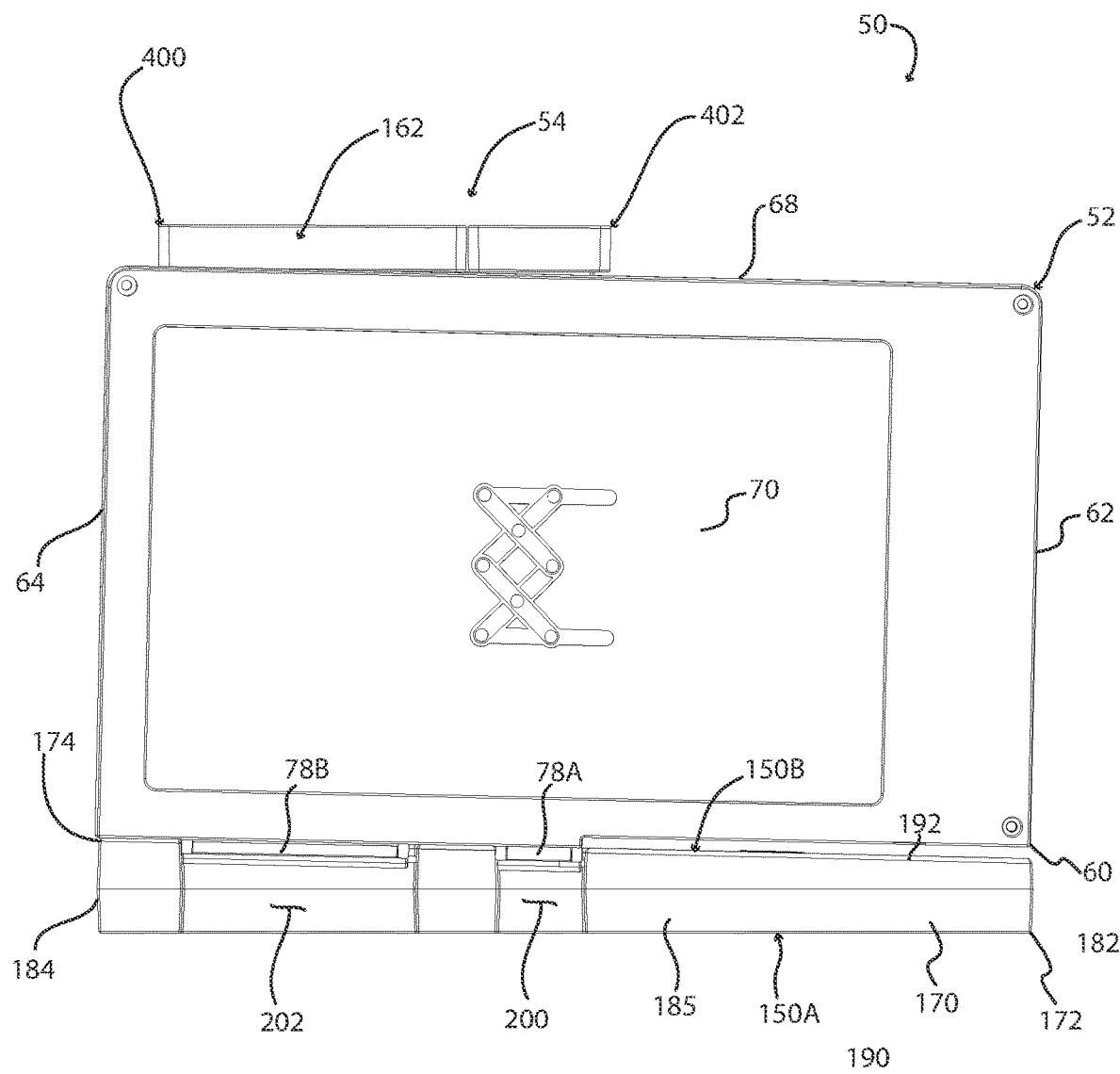
FIG. 14 is a left elevation view of the embodiment of FIG. 9.
Figure 15:
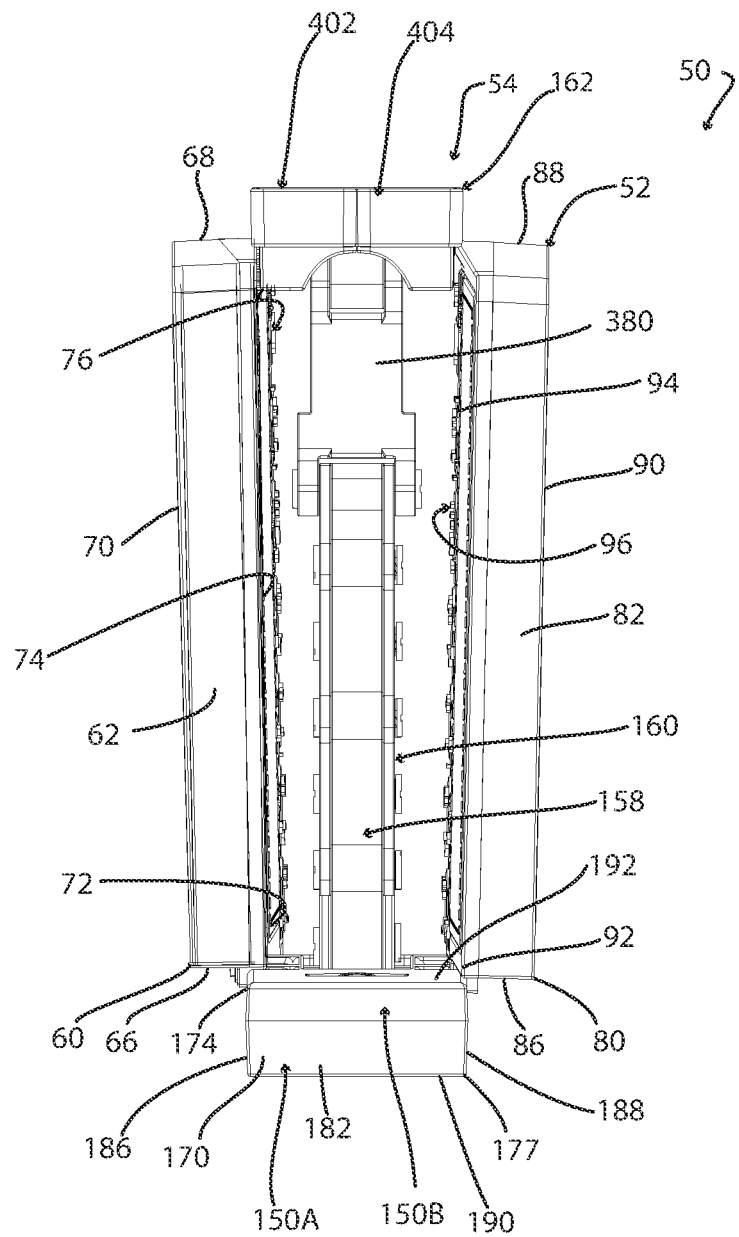
FIG. 15 is a front elevation view of the embodiment of FIG. 9.
Figure 16:
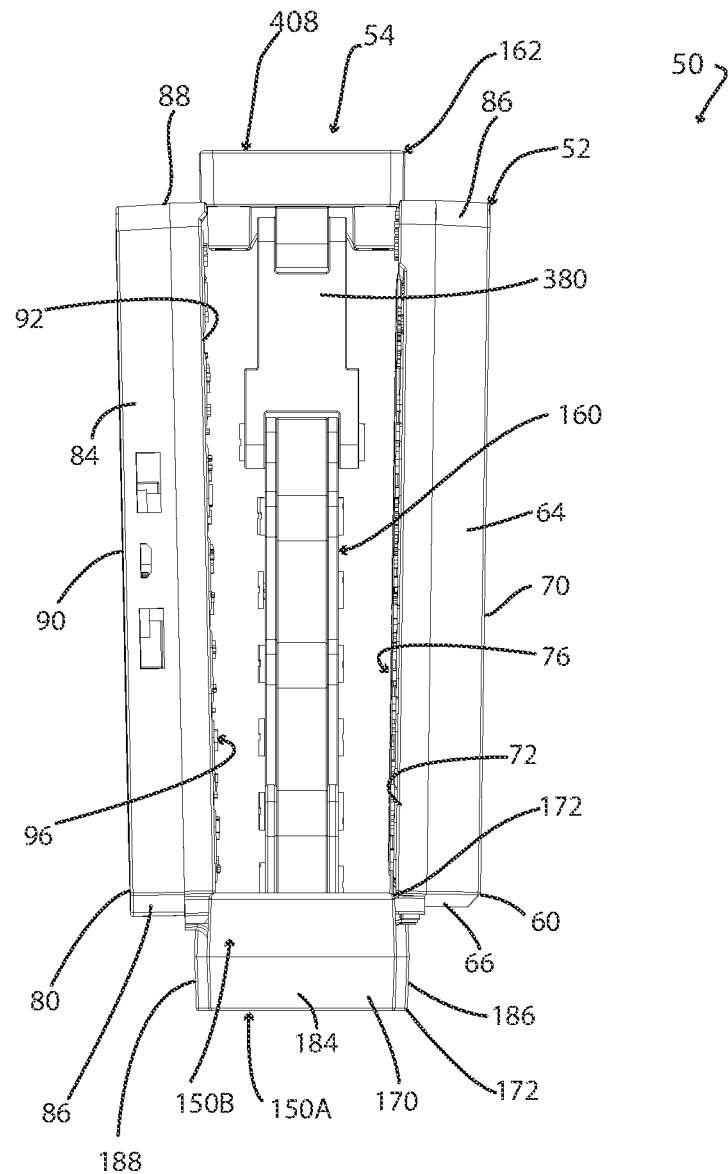
FIG. 16 is a rear elevation view of the embodiment of FIG. 9.

Referring to FIGS. 1-8 in relevant part, the stand assembly 54 includes a housing 150 configured with a trigger 152 used to operate a power drive mechanism 154, and an extensible and retractable stand 158, extending upright from the housing 150. The stand 158 includes a linkage 160 coupled between a tablet computer holder 162 and the housing 150, the linkage 160 extending upright from the housing 150 to the holder 162 over the housing 150. The power drive mechanism 154 is coupled operatively between the trigger 152 and the linkage 160, wherein selective actuation of the trigger 152 automatically activates the power drive mechanism 60, extending and retracting the linkage 160 relative to the keyboard 52 in the directions of double arrow A for raising and lowering the holder 162 over the housing 150 and the keyboard 52 when the keyboard components 60 and 80 are in their in-use or operative positions. FIGS. 1-6 show the linkage 160 retracted supporting the holder 162 at a lowered position over the keyboard 52. FIGS. 7 and 8 show the linkage 160 extended supporting the holder 162 at a raised position raised over the keyboard 52 from the holder's 162 lowered position in FIGS. 106. The linkage 160 supports the holder 162 over the keyboard 52 between the keyboard components 60 and 80 at an intermediate position between the front of the keyboard 52, defined by the keyboard component's 60 and 80 respective front ends 62 and 82, and the rear end of the keyboard 52, defined by the keyboard component's 60 and 80 respective rear ends 64 and 84.

In FIGS. 1-3 and 5-7, the housing 150, centered between and separating the keyboard components 60 and 80, is a part of or otherwise an extension of the keyboard 52. The housing has opposed left and right sides 186 and 188, extending between a front end 182 at the front end of the keyboard 52 and a rear end 184 at the rear end of the keyboard 52. The right and left sides 68 and 86 of the respective keyboard components 60 and 80 are mounted to the respective left and right sides 186 and 188 of the housing 150 for movement between their respective operative positions and stored positions. In their stored positions, the keyboard components 60 and 80 are folded inwardly toward each other, as shown in FIGS. 9-16 in relevant part, extending upright from the respective sides 186 and 188 and juxtaposed on either side of the stand 158.

Figure 2:
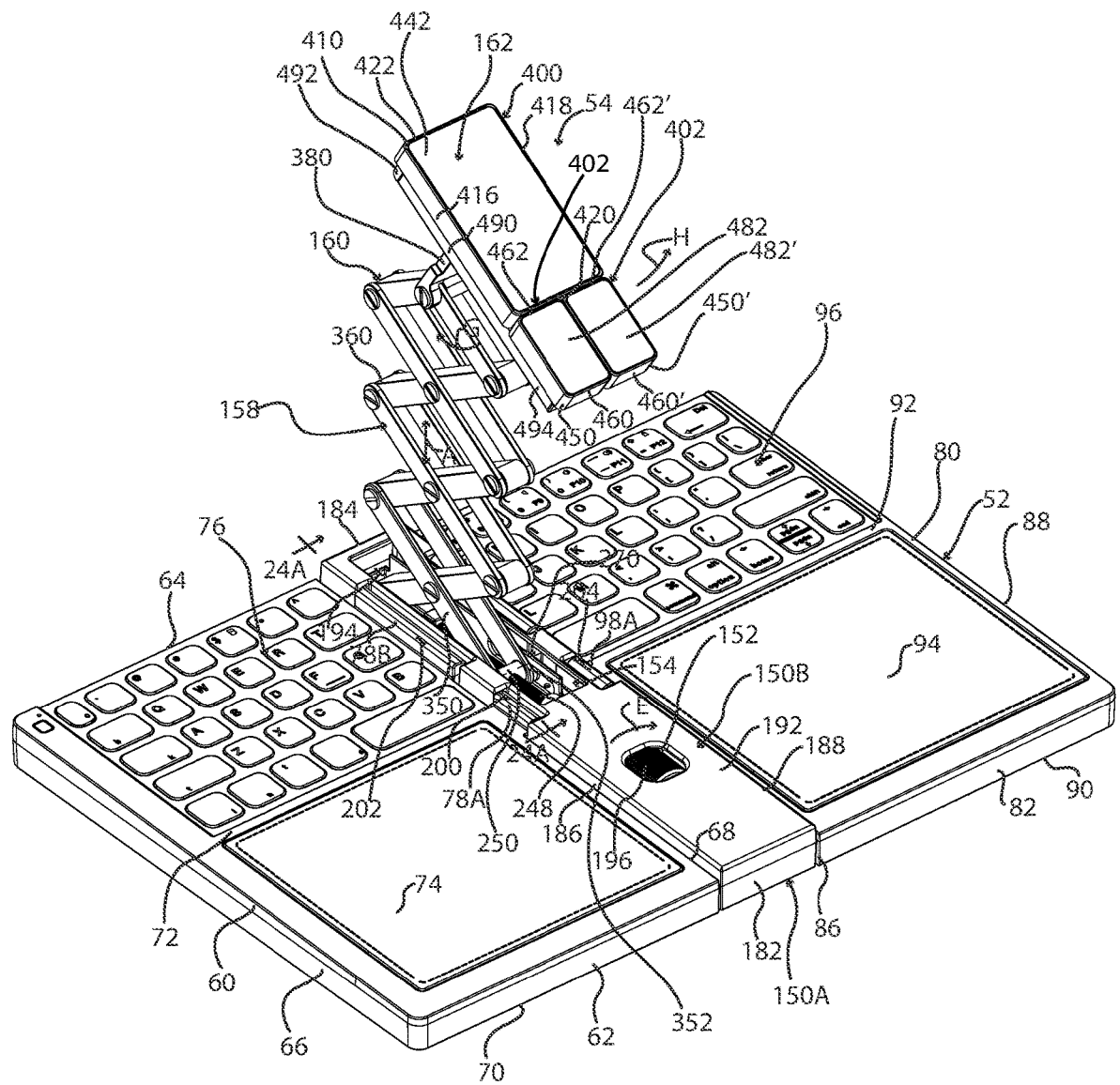
FIG. 2 is an upper left perspective view of the embodiment of FIG. 1.
Figure 3:
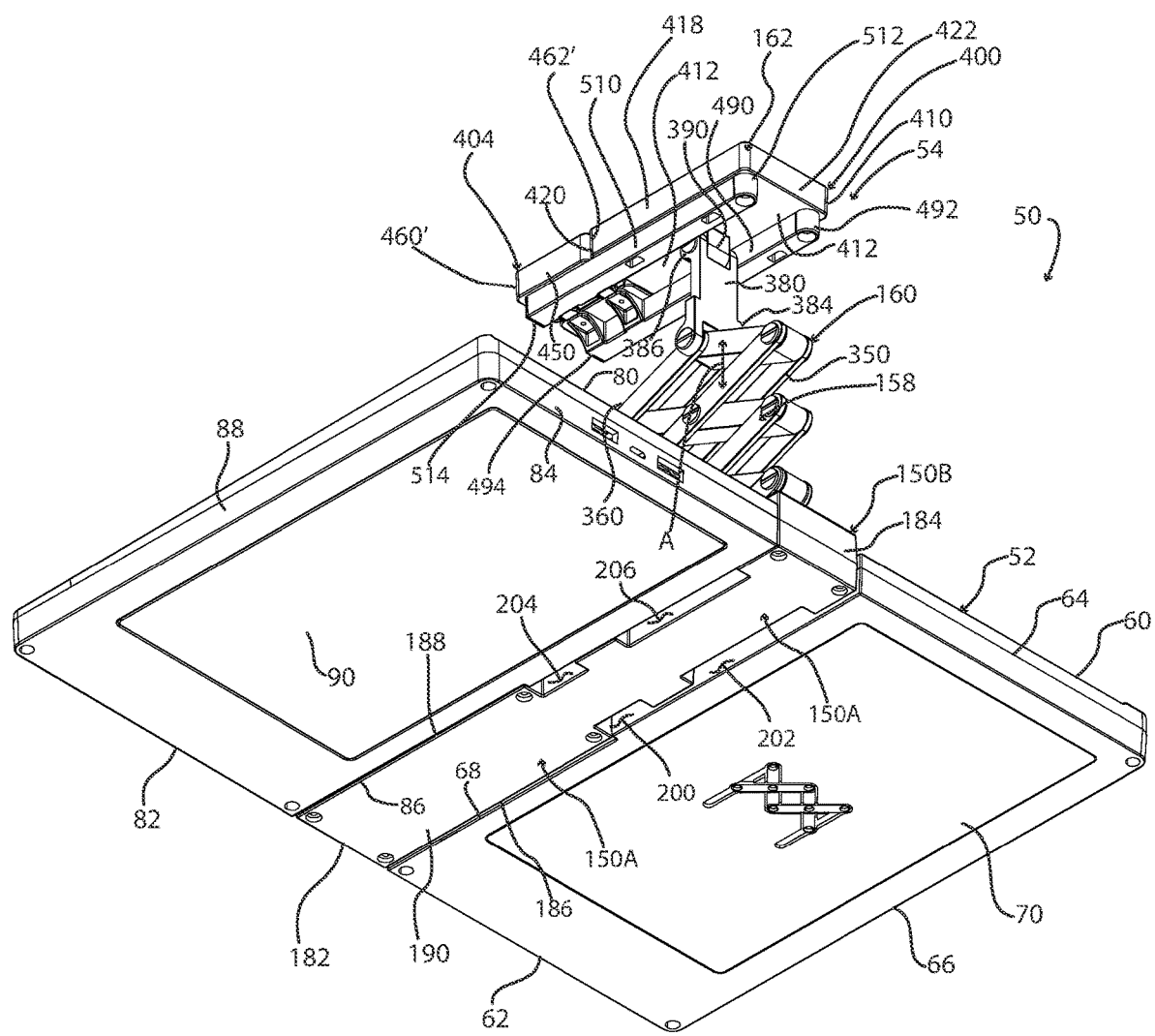
FIG. 3 is a lower right perspective view of the embodiment of FIG. 1.
Figure 4:
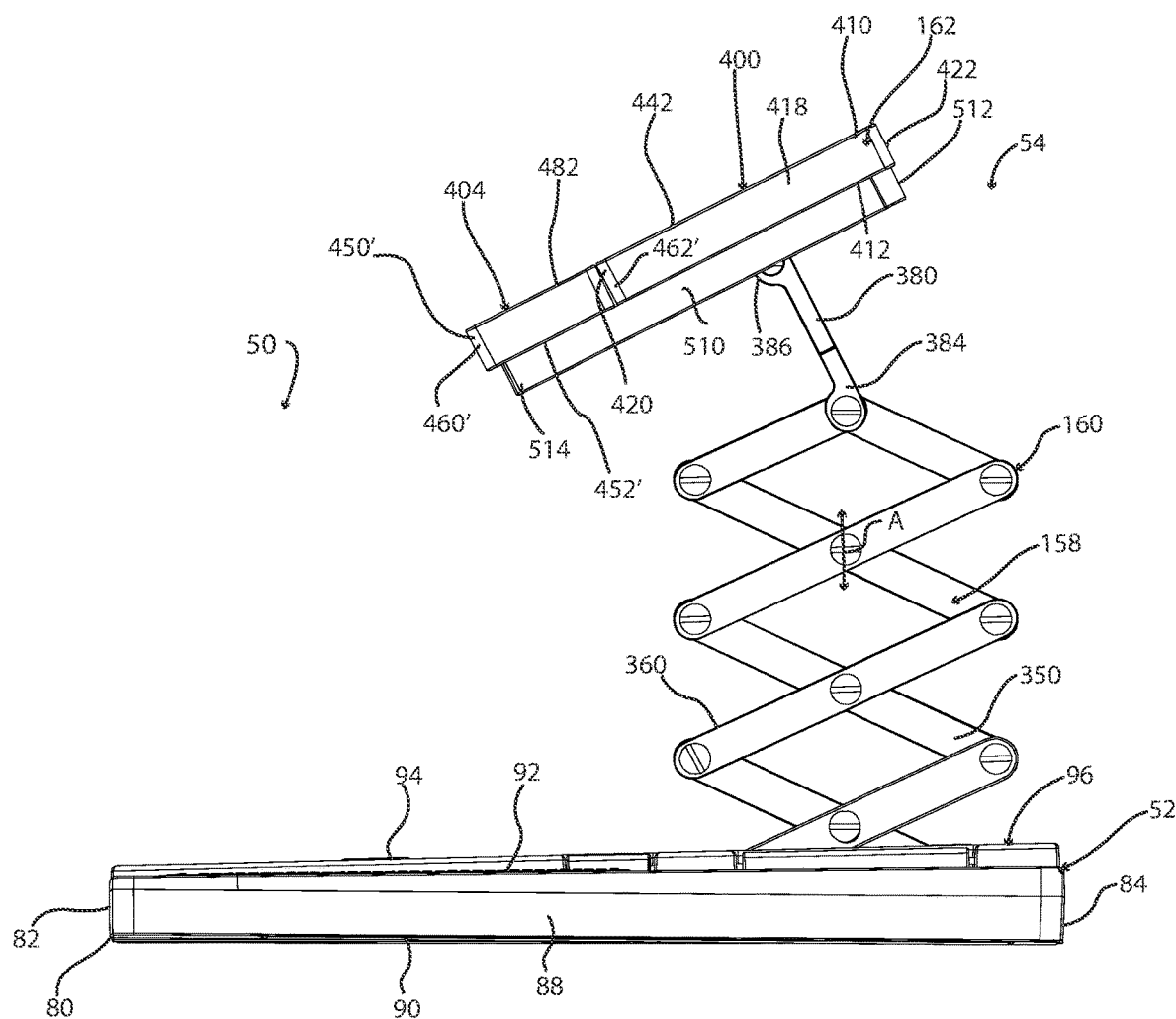
FIG. 4 is a right elevation view of the embodiment of FIG. 1, the left elevation view being substantially the same thereof.
Figure 5:
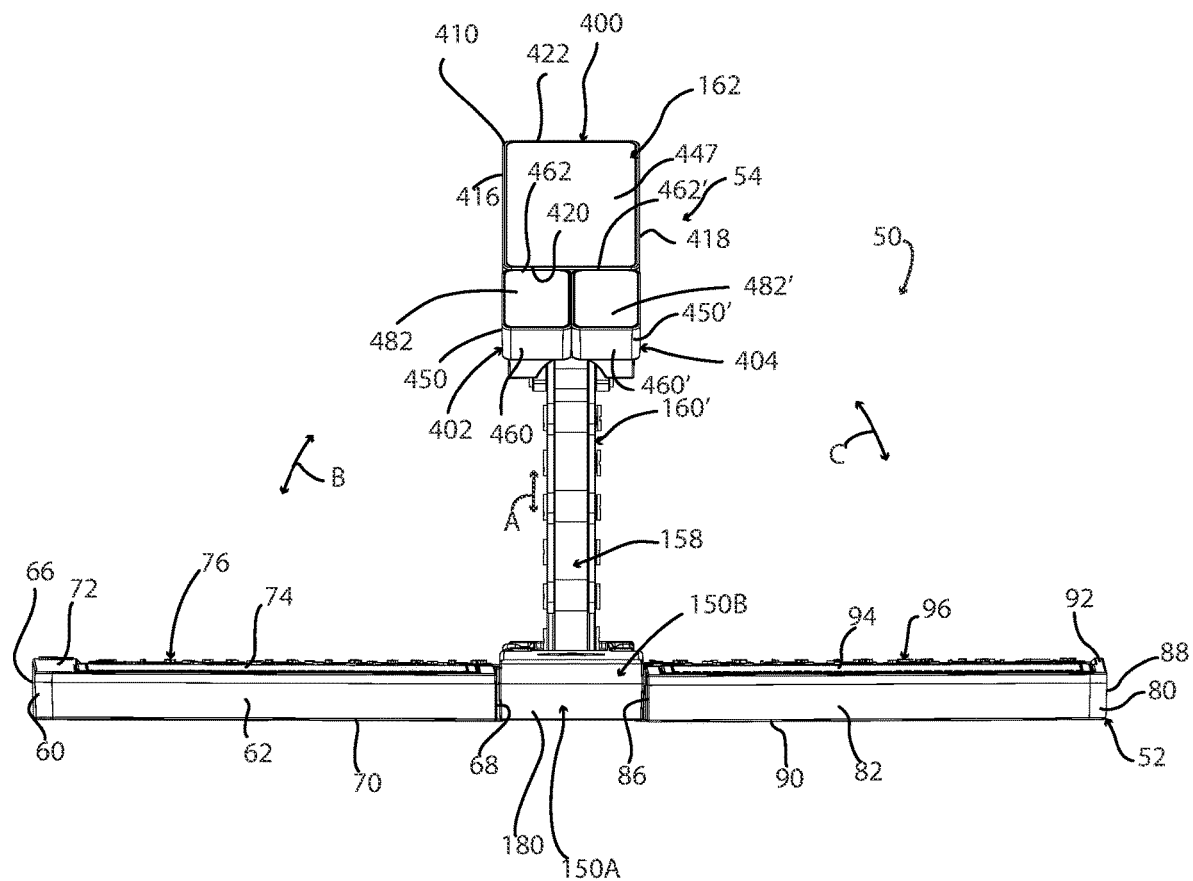
FIG. 5 is a front elevation view of the embodiment of FIG. 1.
Figure 6:
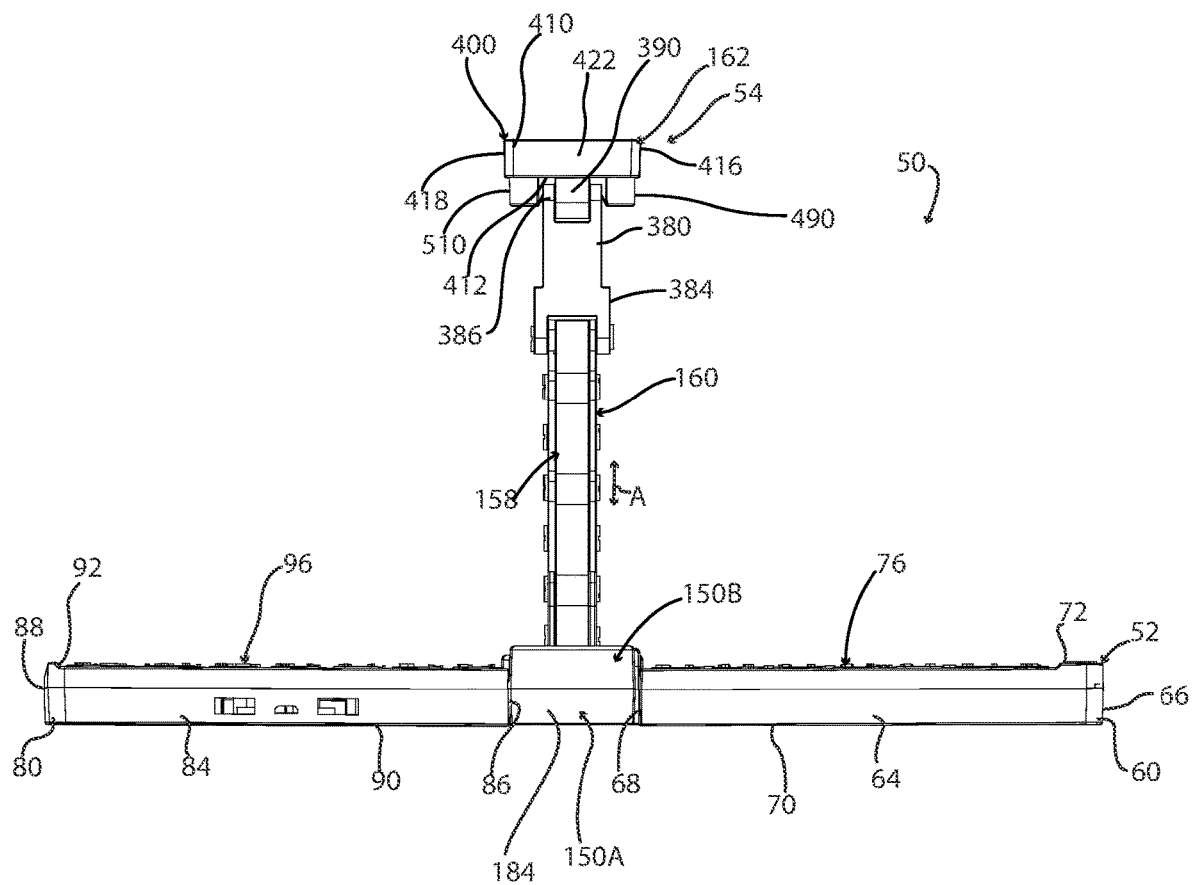
FIG. 6 is a rear elevation view of the embodiment of FIG. 1.

In FIGS. 1 and 2, the right side 68 of the keyboard component 60 has elongate cylindrical members 78A and 78B. The cylindrical members 78A and 78B project outwardly from the right side 68, are spaced apart longitudinally along the right side 68, and are hinged to the housing's 150 left side, pivotally or otherwise rotatably connecting the keyboard component 60 to the housing's 150 left side, enabling the keyboard component 60 to turn in the directions of double arrow B in FIG. 5 between its operative position in FIGS. 1-3 and 5-7 and its stored position in FIGS. 9-12 and 14-16. The length of the cylindrical member 78A, the keyboard component's 60 front cylindrical member, is shorter than the length of the cylindrical member 78B, the keyboard component's 60 rear cylindrical member.

The left side 86 of the keyboard component 80 has elongate cylindrical members 98A and 98B. The cylindrical members 98A and 98B project outwardly from the left side 86, are spaced apart longitudinally along the left side 86, and are hinged to the housing's 150 right side, pivotally or otherwise rotatably connecting the keyboard component 80 to the housing's 150 right side, enabling the keyboard component 80 to turn in the directions of double arrow C in FIG. 5 between its operative position in FIGS. 1-8 and its stored position in FIGS. 9-13, 15, and 16. The length of the cylindrical member 98A, the keyboard component's 80 front cylindrical member, is shorter than the length of the cylindrical member 98B, the keyboard component's 80 rear cylindrical member. The cylindrical members 78A and 98A are identical and spaced apart axially. The cylindrical members 78B and 98B are identical and spaced apart axially.

FIGS. 17-20 illustrate the stand assembly 54 without the keyboard components 60 and 80. Referring to FIGS. 17-20 in relevant part, the housing 150, an elongate, hollow, and generally rectangular body or shell formed by the assembly of a lower or bottom part 150A and an upper or top part 150B, includes a continuous sidewall 170 extending upright between a lower edge or rim 172 of the bottom part 150A and an upper edge or rim 174 of the top part 150B. The sidewall 170, formed by the joined bottom and top parts 150A and 150B, defines the housing's 150 opposite front and rear ends 182 and 184 and its opposite sides 186 and 188, extending between opposite front and rear ends 182 and 184. Side 186 is the housing's 150 first or left side configured to be hinged to the previously described keyboard component 60, and side 188 is the housing's 150 second or right side configured to be hinged to the previously described keyboard component 80. The housing 150 has a length from its front end 182 to its rear end 184 that is longer than its width from side 186 to side 186. The bottom part 150A has a horizontal bottom 190 affixed to the lower edge 172, forming the housing's 150 closed bottom. The top part 150B has a horizontal top 192 and a linkage opening 194 over the housing's horizontal bottom 190.

Figure 24A:
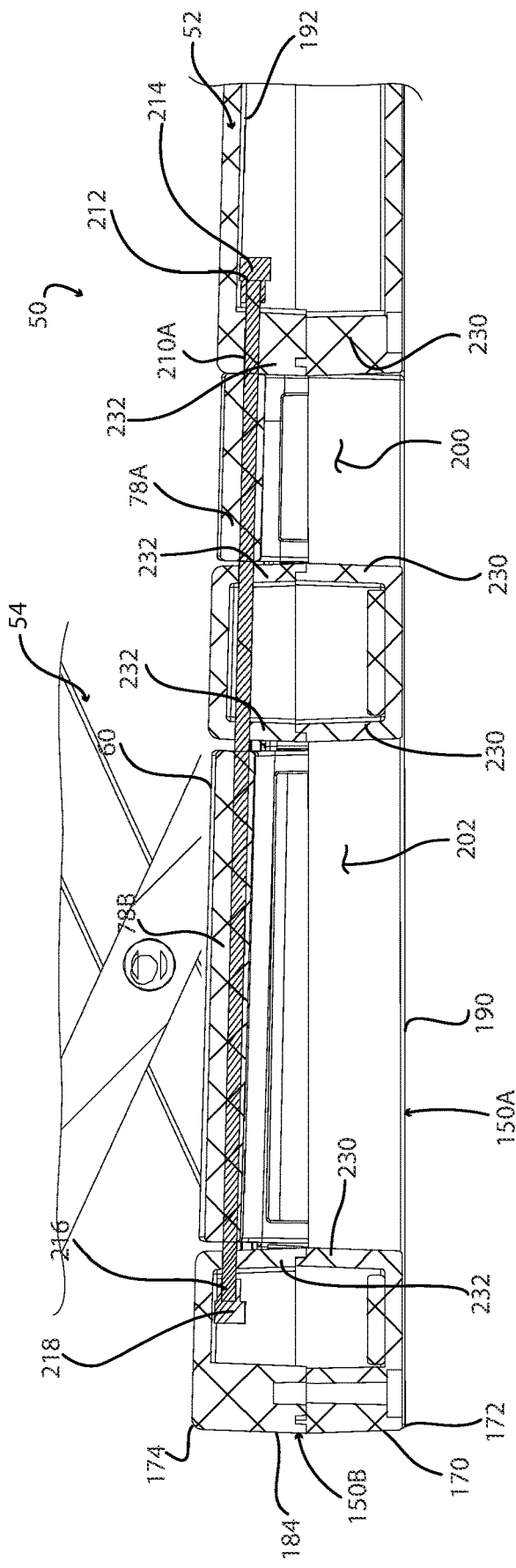
FIG. 24A is a section view taken along line 24A-24A of FIG. 2.
Figure 24B:
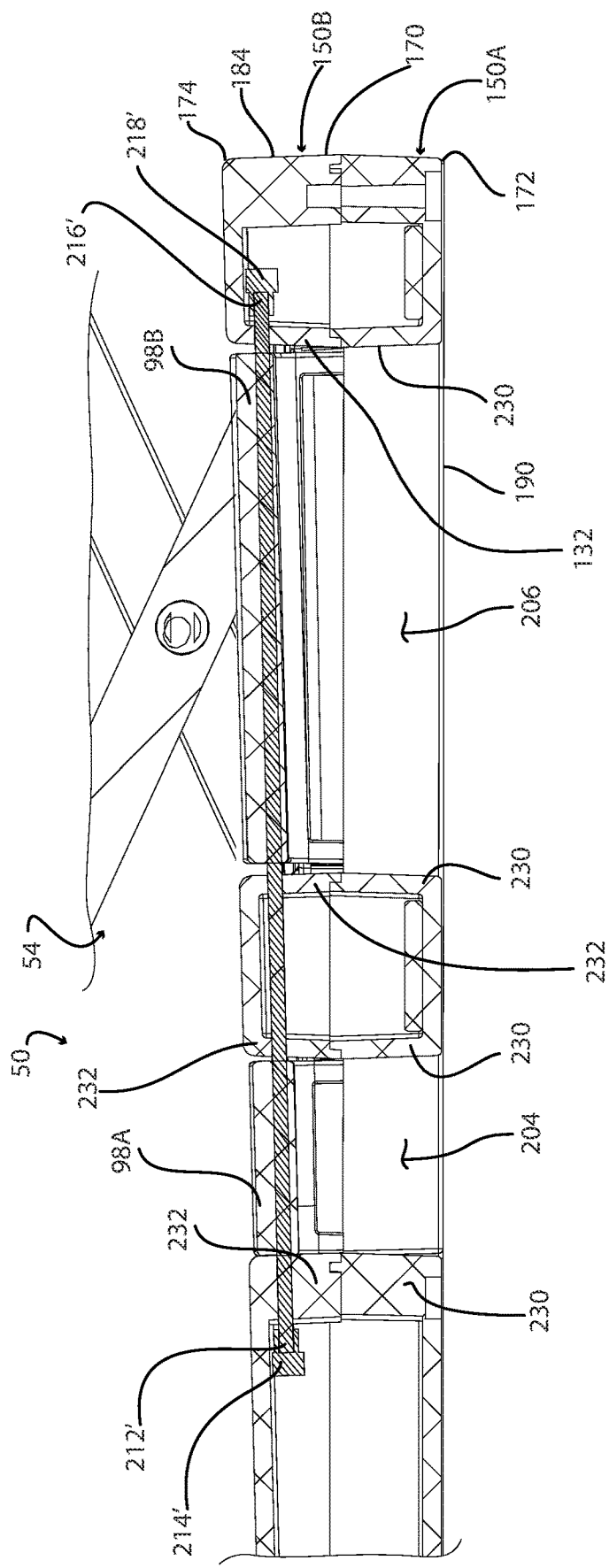
FIG. 24B is a section view taken along line 24B-24B of FIG. 1.

The horizontal top 192 affixed to the upper edge 174 and configured with a central trigger opening 196 into the housing 150 extends between the opposite sides 186 and 188 from the housing's 150 front end 180 to the linkage opening 194 defined by the upper edge 174. The horizontal top 192 and the linkage opening 194 intersect at an intermediate position between the housing's 150 front and rear ends 182 and 184. The trigger opening 196 is between the linkage opening 194 and housing's 150 front end 182. The linkage opening 194 into the housing 150 extends between the opposite sides 186 and 188 from the horizontal top 192 to the housing's 150 rear end 184. The bottom part 150A and the top part 150B are configured with suitable snap fittings. This expedient joins them together and enables them to be separated and reassembled as needed. For example, FIGS. 24A and 24B illustrates bottom part 150A configured with fittings 230 that snap receive corresponding fittings 232 of the top part 150B. A user may employ any suitable configuration of fittings 230 and 232 to join bottom part 150A with top part 150B and may also use a suitable adhesive, fasteners, such as screws, pins, or the like.

With continuing reference to FIGS. 17-20 in relevant part, the left side 186 of the housing's 150 sidewall 170 is contoured, forming notches 200 and 202 that face outwardly.

Notches 200 and 202 extend vertically from the housing's 150 lower edge 172 to its upper edge 174 and are aligned longitudinally between the housing's 150 horizontal top 192 and its rear end 184. In this example, notch 200 is smaller than notch 202. The right side 188 of the housing's 150 sidewall 170 is, like the housing's 150 left side 186, contoured, forming notches 204 and 206 that face outwardly. Notches 204 and 206 extend vertically from the housing's 150 lower edge 172 to its upper edge 174 and are aligned longitudinally between the housing's 150 horizontal top 192 and its rear end 184. In this example, notch 204 is smaller than notch 204.

Notches 200 and 204 are identical and spaced apart axially, and notches 202 and 206 are identical and spaced apart axially.

The housing's 150 sides 186 and 188 are configured with respective shafts or pins 210A and 210B. Pins 210A and 210B are elongate, longitudinally straight, identical, and carried by the housing's 150 top part 150B. The sidewall 170 supports pins 210A and 210B, pin 210A extending longitudinally along the housing's 150 side 186 through the respective notches 200 and 202 and pin 210B extending longitudinally along the housing's 150 side 188 through the respective notches 204 and 206.

In FIGS. 1 and 2, the keyboard component's 60 right side 68 and the housing's 150 left side 186 are parallel and longitudinally juxtaposed. The cylindrical member 78A extends into correspondingly-sized notch 200 and the cylindrical member 78B extends into correspondingly-sized notch 202, also shown in FIG. 24A. In FIG. 24A, pin 210A has a front end 212 configured with an enlarged front head 214 and an opposite rear end 216 configured with an enlarged rear head 218. Pin 210A extends longitudinally outward through an appropriate opening through sidewall 170 from front head 214 within housing 150 to and through cylindrical member 78A in notch 202, into housing 150 through another appropriate hole through sidewall 170 from notch 200, again outward from within housing 150 through yet another appropriate hole through sidewall 170 to and through cylindrical member 78B in notch 202, and back into housing 150 through still another appropriate hole through sidewall 170 from notch 202 to rear head 218 within housing 150, connecting the keyboard component's 60 right side 68 to the housing's 150 left side 186 hingedly. The expedient of the described hinged connection connecting the keyboard component's 60 right side 68 to the housing's 150 left side 186 enables the keyboard component 60 to turn, pivot or otherwise rotate in the directions of double arrow B in FIG. 5 between its in-use or operative position in FIGS. 1-3 and 4-7, extending outward laterally from the housing's 150 left side 186, and the keyboard component's 60 stored position in FIGS. 9-12 and 14-16, extending upright from the housing's 150 left side 186. The pin's 210A front and rear heads 214 and 218 in the housing 150 interact with the sidewall 170, disabling the pin 210A from withdrawing from the housing 150 and the cylindrical members 78A and 78B.

In FIGS. 1 and 2, the keyboard component's 80 left side 86 and the housing's 150 right side 188 are parallel and longitudinally juxtapose. The cylindrical member 98A extends into correspondingly-sized notch 204 and the cylindrical member 98B extends into correspondingly-sized notch 206, also shown in FIG. 24B. In FIG. 24B and in common with pin 210A, pin 210B shares front end 212', front head 214', rear end 216', and rear head 218'. Since the pins 210A and 210B share common reference numerals, the pin's 210B reference numerals include prime ("'") symbols for clarity. Pin 210B extends longitudinally outward through an appropriate opening through sidewall 170 from front head 214' within housing 150 to and through cylindrical member 98A in notch 204, into housing 150 through another appropriate hole through sidewall 170 from notch 204, again outward from within housing 150 through yet another appropriate hole through sidewall 170 to and through cylindrical member 98B in notch 206, and back into housing 150 through still another appropriate hole through sidewall 170 from notch 206 to rear head 218' within housing 150, connecting the keyboard component's 80 left side 86 to the housing's 150 right side 188 hingedly. The expedient of the described hinged connection connecting the keyboard component's 80 left side 86 to the housing's 150 right side 188 enables the keyboard component 80 to turn, pivot or otherwise rotate in the directions of double arrow C in FIG. 5 between its in-use or operative position in FIGS. 1-8, extending outward laterally from the housing's 150 right side 188, and the keyboard component's 80 stored position in FIGS. 9-13, 15 and 16, extending upright from the housing's 150 right side 188. The pin's 210B front and rear heads 214 and 218 in the housing 150 interact with the sidewall 170, disabling the pin 210B from withdrawing from the housing 150 and the cylindrical members 98A and 98B.

Figure 21:
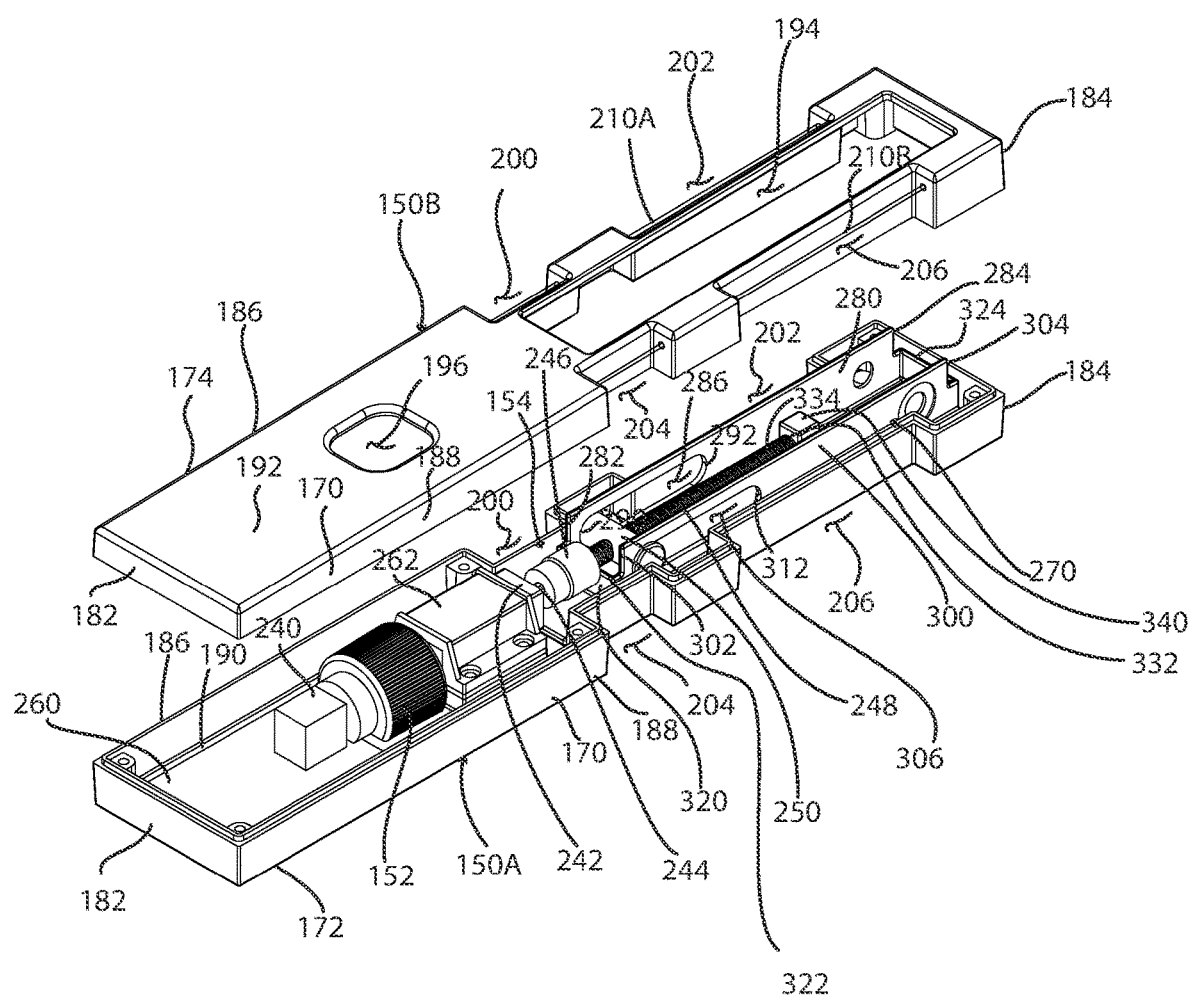
FIG. 21 is an upper right perspective view of the housing of the embodiment of FIG. 17, the housing including a bottom part and a top part, the top part shown withdrawn from a bottom part, shown configured with a carriage, the trigger, and the power drive mechanism including a rotating shank, the linkage concurrently coupled to the carriage and the rotating shank.
Figure 22:
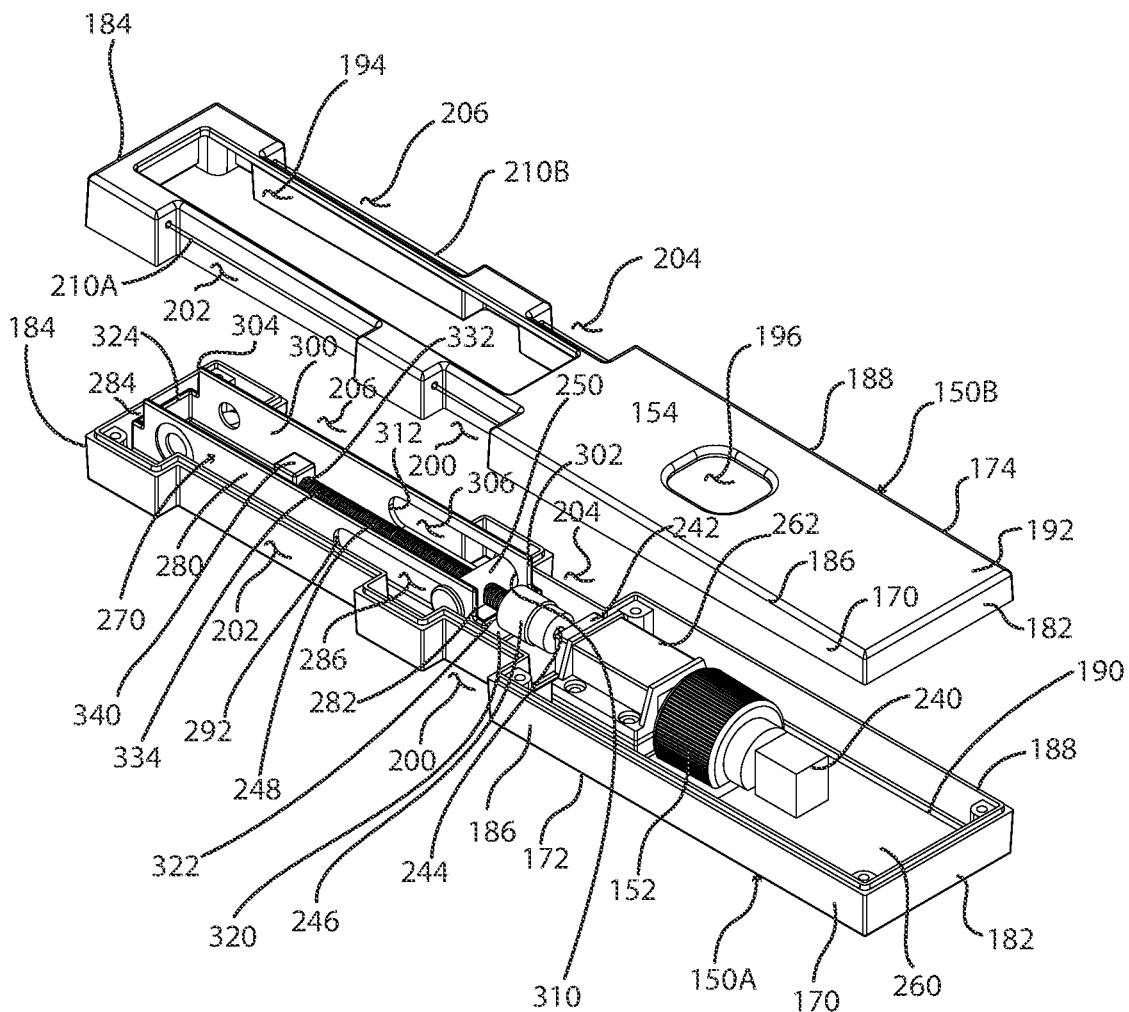
FIG. 22 is an upper left perspective view of the embodiment of FIG. 21.
Figure 23:
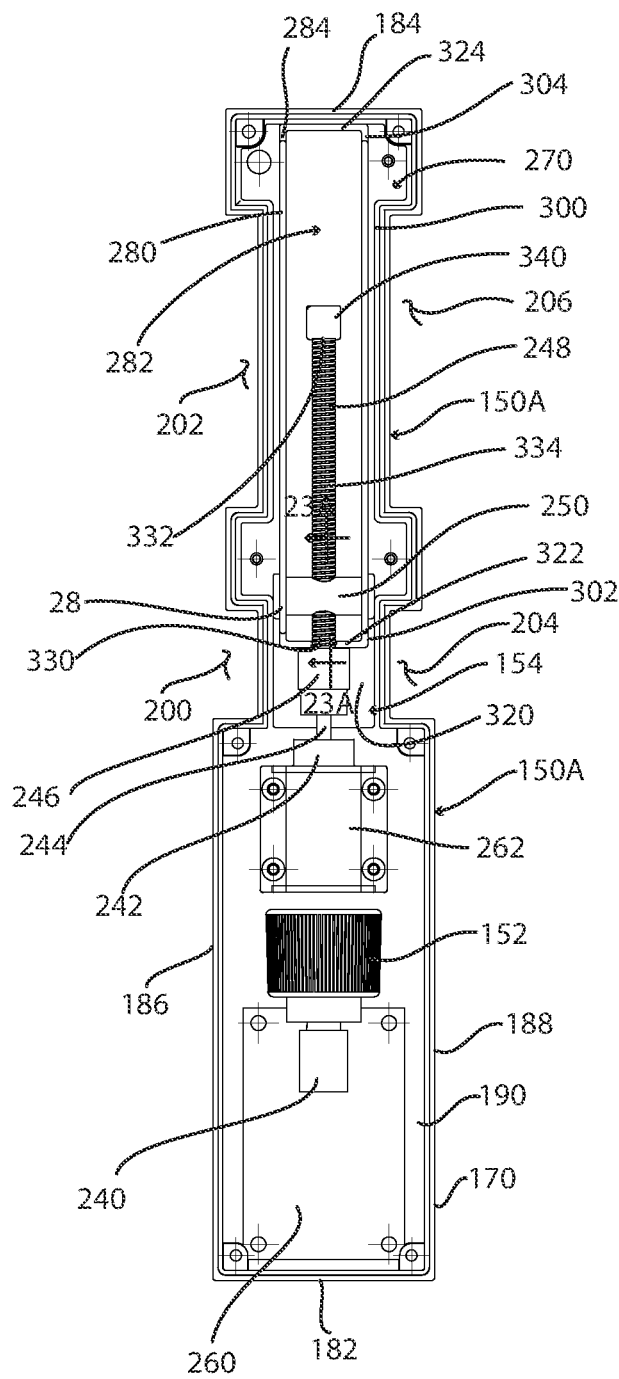
FIG. 23 is a top plan view of the bottom of the housing of FIG. 21.

The bottom part 150A supports the stand assembly's 43 power drive mechanism 154, illustrated in FIGS. 21-23. Mechanism 154, an electrically-powered mechanism that works on DC and is operated by the trigger 152 automatically and mounted atop the bottom part's 150A horizontal bottom 190, includes a conventional DC motor speed controller 240, a standard DC motor 242 including a drive shaft 244 configured with an attached fitting 246, a shank 248, and a pin 250, in this embodiment a standard screw binding post, also called a sex bolt or Chicago screw, a two-component fastener system consisting of an internally threaded post barrel and a mating screw. The mechanism 154 is wired electrically to and powered by DC from one or both the keyboard components 60 and 80. In alternate embodiments, the mechanism 154 can be powered by DC from its own rechargeable battery and a standard power converter that converts AC to DC when the user plugs the stand assembly 54 into a standard electrical outlet and charges the battery at the same time. Trigger 152, in this example a standard two-way rotary switch, is electrically connected to the motor speed controller 240 and the motor 242 conventionally such as by wiring or printed circuitry, registers with the trigger opening 196 and extends partially into the horizontal top's 192 trigger opening 96 in FIGS. 17 and 18, enabling a user to access and operate it by hand to actuate the mechanism 154. The motor speed controller 240, carried by a base plate 260 secured adhesively or with appropriate fasteners or mounts atop the horizontal bottom 190, is under the horizontal top 192 and between the trigger 152 and the housing's 150 front end 182. The trigger 152 is between the motor speed controller 240 and the motor 242, housed in a casing 262 under the horizontal top 192 and secured adhesively or with appropriate fasteners or mounts atop the horizontal bottom 190. The drive shaft 244 extends forwardly from its motor 242 to the fitting 246, extending beyond the horizontal top 192 under the housing's 194 linkage opening 194, coupled to the shank 248, drivingly coupling the motor 242 to the shank 248. Selective actuation of the trigger 152 automatically activates the motor 242 rotating the drive shaft 244, imparting corresponding rotation to the shank 248 drivenly coupled to the mechanism's 154 motor 242.

The housing's 150 bottom part 150A has a carriage 270. With additional reference to FIGS. 25 and 26 in relevant part, the carriage 270 includes longitudinally straight, parallel, axially spaced apart walls 280 and 300 extending upright from a base plate 320. The wall 280 is the carriage's 270 first or left wall and the wall 300 is the carriage's 270 second or right wall. The walls 280 and 300 are identical. The wall 280 includes an inner end 282, an outer end 284, and a straight, elongate slot 286 therethrough, extending from an inner end wall 290 proximate to the wall's 280 inner end 282 to an outer end wall 292 at an intermediate position between the wall's 280 inner and outer ends 282 and 284. The wall 300 includes an inner end 302, an outer end 304, and a straight, elongate slot 306 therethrough, extending from an inner end wall 310 proximate to the wall's 300 inner end 302 to an outer end wall 312 at an intermediate position between the wall's 300 inner and outer ends 302 and 304. The slots 286 and 306 are identical and spaced apart axially. Carriage 270 additionally includes opposite front and rear stub walls 322 and 324. The front stub wall 322 at the front end of the carriage 270 extends upright from the base plate 320 and rigidly connects the inner ends 282 and 302 of the respective walls 280 and 300. The rear stub wall 324 at the rear end of the carriage 270 extends upright from the base plate 320 and rigidly connects the outer ends 284 and 304 of the respective walls 280 and 300. The pin 250 is between the walls 280 and 300 and extends outwardly in either direction into the respective slots 286 and 306. The pin 250 is free to concurrently travel in the slots 286 and 306 reciprocally, between the inner and outer end walls 290 and 292 of slot 286 and between the inner and outer end walls 310 and 312 of slot 306.

The carriage 270, a part of the housing 150, is under the linkage opening 194 and mounted atop the bottom part's 150A horizontal bottom 190. The carriage 270 extends between the fitting 246 and the housing's 150 rear end 184 longitudinally between the front stub wall 322 adjacent to the fitting 246 and the rear stub wall 324 juxtaposed inboard with sidewall 170 at the housing's 150 rear end 184. Adhesive, appropriate fasteners or mounts secure the carriage's 270 base plate 320 atop the bottom part's 150A horizontal bottom 190. The walls 280 and 300 extend upright from the base 320 toward the linkage opening 194 and longitudinally from their respective inner ends 282 and 302 adjacent to the fitting 246 to their respective outer ends 284 and 304 joined by the rear stub wall 324 adjacent to the housing's 150 rear end 184. The walls 280 and 300 are longitudinally juxtaposed inboard along the sidewall 170 at the housing's 150 respective left and right sides 186 and 188.

Referring to FIGS. 21-23 in relevant part, the mechanism's 154 shank 248 is under the linkage opening 194, has an inner end 330 and an outer end 332, is longitudinally straight from the inner end 330 to the outer end 322 and threaded externally, having an external thread 324 between its inner and outer ends 330 and 332. The fitting 246, a chuck rigidly affixed to the motor's 242 drive shaft 244, fits over and rigidly secures the shank's 248 inner end 330, coupling the shank 248 to the mechanism's 154 motor 242 drivenly. The shank 248 extends forward under the linkage opening 194 toward the housing's 150 rear end 184 from the fitting 246, over the front stub wall 322, through a hole 252 through the pin 250 in FIG. 23A and between the carriage's walls 280 and 300 to the shank's 248 outer end 332 mounted rotatably or otherwise journaled for rotation to a stanchion 340. The stanchion 340, an upright support under the linkage opening 194, is secured adhesively or with appropriate fasteners or mounts atop the carriage's 270 base plate 320 centrally between the carriage's 270 walls 280 and 300. The fitting 246 and the carriage's 270 stanchion 340 support the shank 248 under the linkage opening 194, between the carriage's 270 walls 280 and 300, and over the carriage's 270 base plate 320 secured atop the bottom part's 150A horizontal bottom 190. The shank 248 is parallel to the carriage's 270 walls 280 and 300.

Figure 23A:
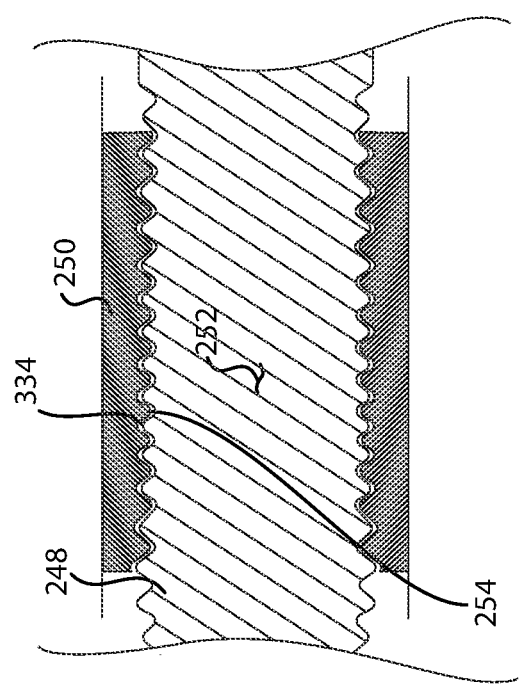
FIG. 23A is a section view taken along line 23A-23A of FIG. 23.
Figure 25:
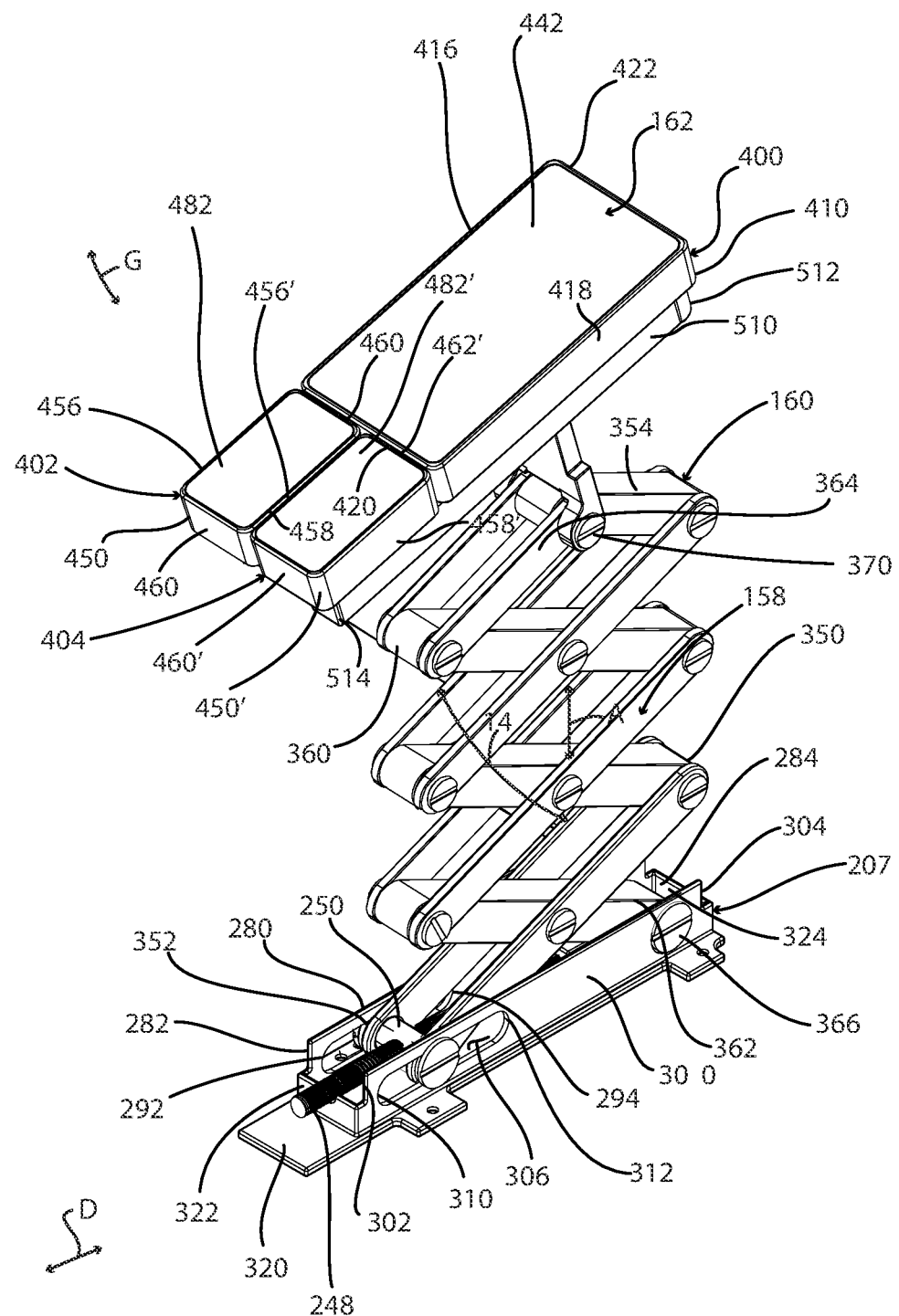
FIG. 25 is a perspective view corresponding to FIG. 17, illustrating the linkage concurrently coupled to the carriage and the rotating shank, the linkage shown retracted lowering the holder over the carriage.
Figure 26:
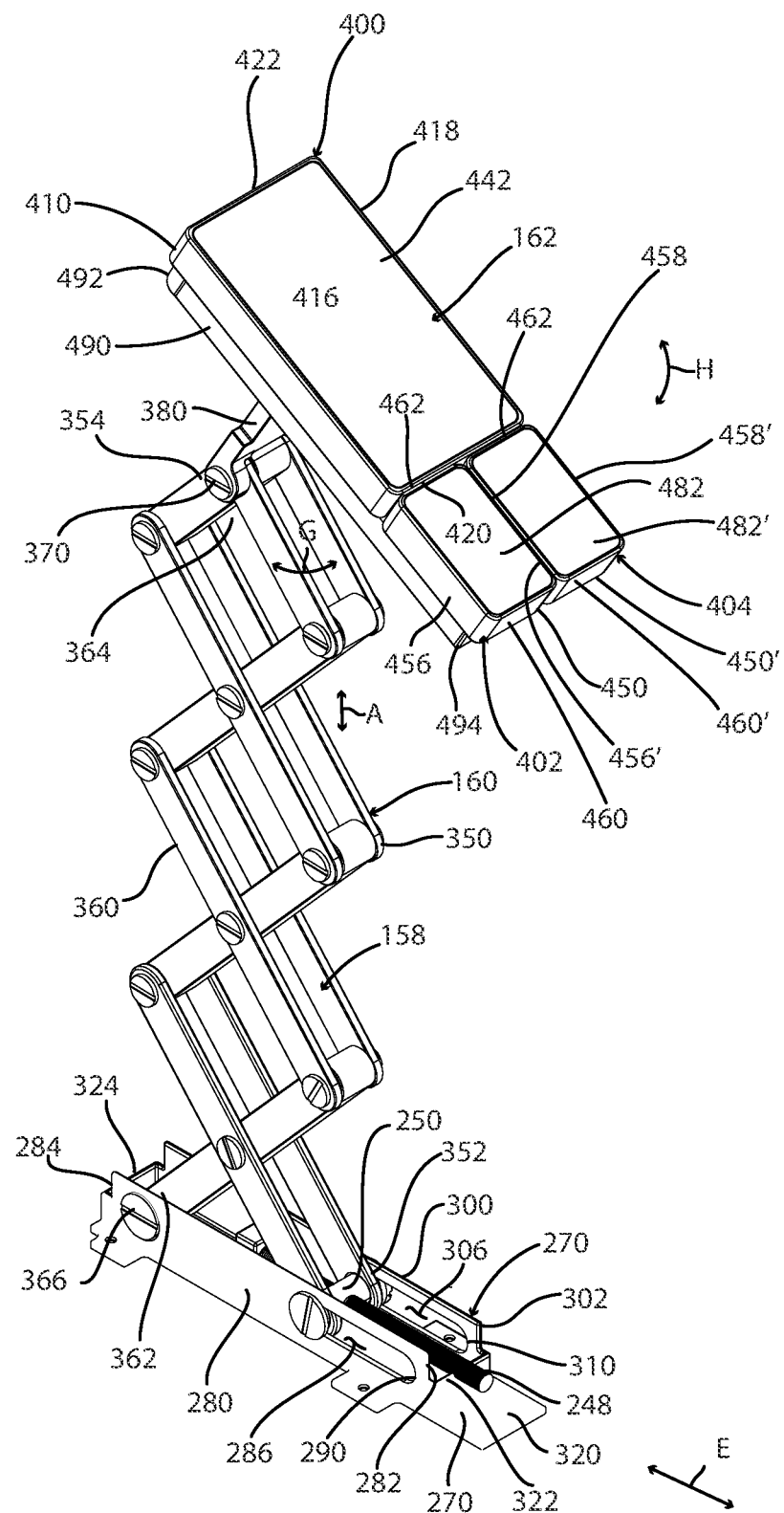
FIG. 26 is a view of the embodiment of FIG. 25, illustrating the linkage extended raising the holder over the carriage.

Referring to FIG. 23A, the pin's 250 hole 252 through which shank 248 extends is configured with an internal thread 254. The pin's 250 internal thread 254 corresponds to and threads rotationally over and on the shank's 248 external thread 334. In FIGS. 25 and 26, the application of the pin 250 into the carriage's 170 respective slots 286 and 306 disables or otherwise restrains the pin 250 from rotating about the shank 248. Accordingly, the shank 248, a rotating shank, is free to rotate relative to the pin 250, which is stationary rotationally. Since the internal thread 254 of the internally-threaded pin 250 threads over the external thread 334 of the externally-threaded shank 248 and the pin 250 is disabled from rotating about the shank 248, rotation of the shank 248 in opposite directions, clockwise and counterclockwise directions, relative to the pin 250 imparts corresponding movement of the pin 250 in reciprocal directions indicated by double arrow D in FIGS. 23A, 25 and 26 over the shank's 248 external thread 334 and through the respective slots 286 and 306 in FIGS. 25 and 26 longitudinally between the slot's 286 inner and outer ends walls 290 and 292 and the slot's 306 inner and outer end walls 310 and 312. The slots 286 and 306 restrain the pin 250 reciprocally. The inner end walls 290 and 310 limit the pin 250 from moving forwardly therebeyond toward the housing's 150 front end 182. The outer end walls 292 and 312 limit the pin 250 from moving rearwardly therebeyond toward the housing's 150 rear end 184.

Figure 17:
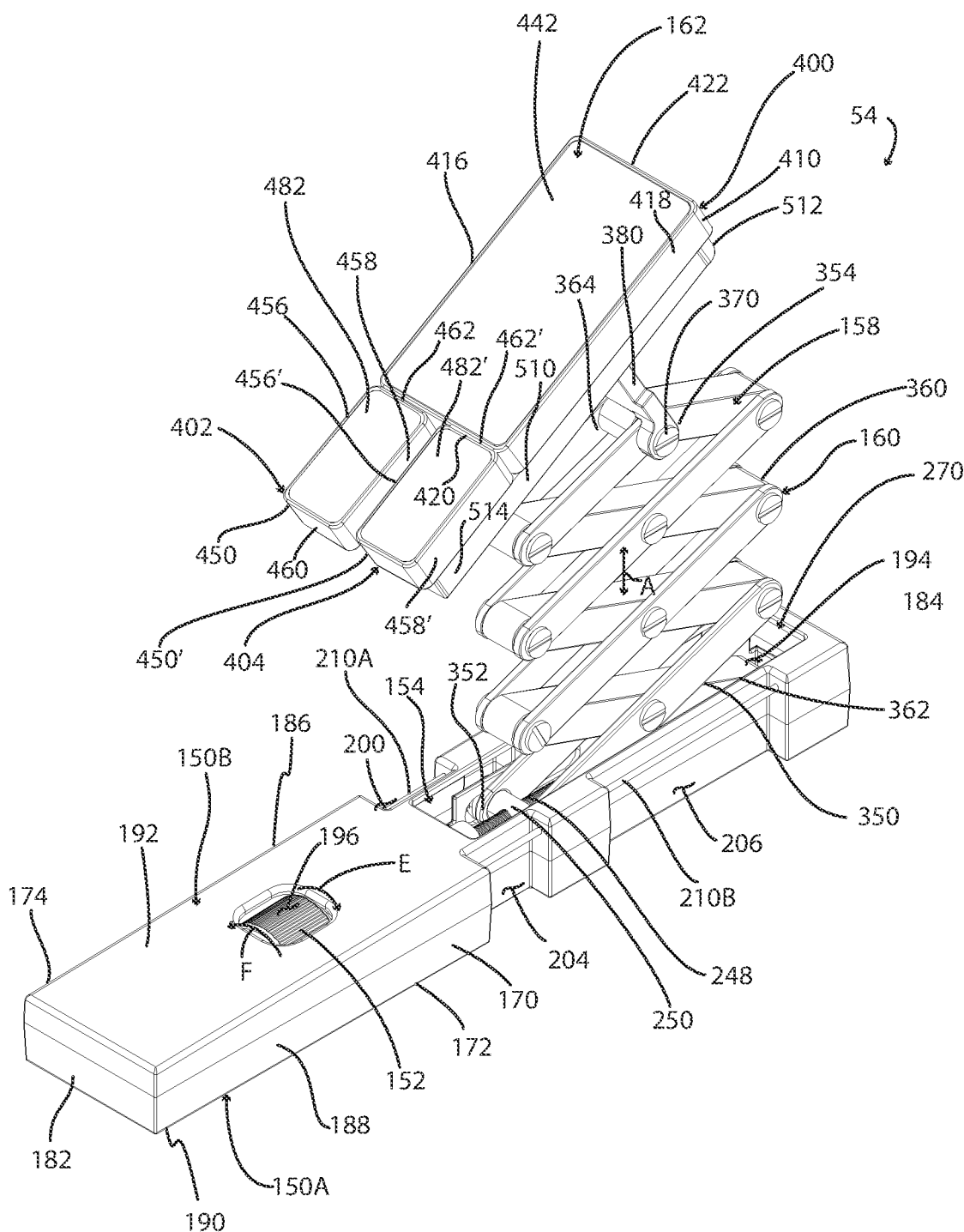
FIG. 17 is an upper right perspective view of the stand assembly first illustrated in FIG. 1, without the keyboard components.
Figure 18:
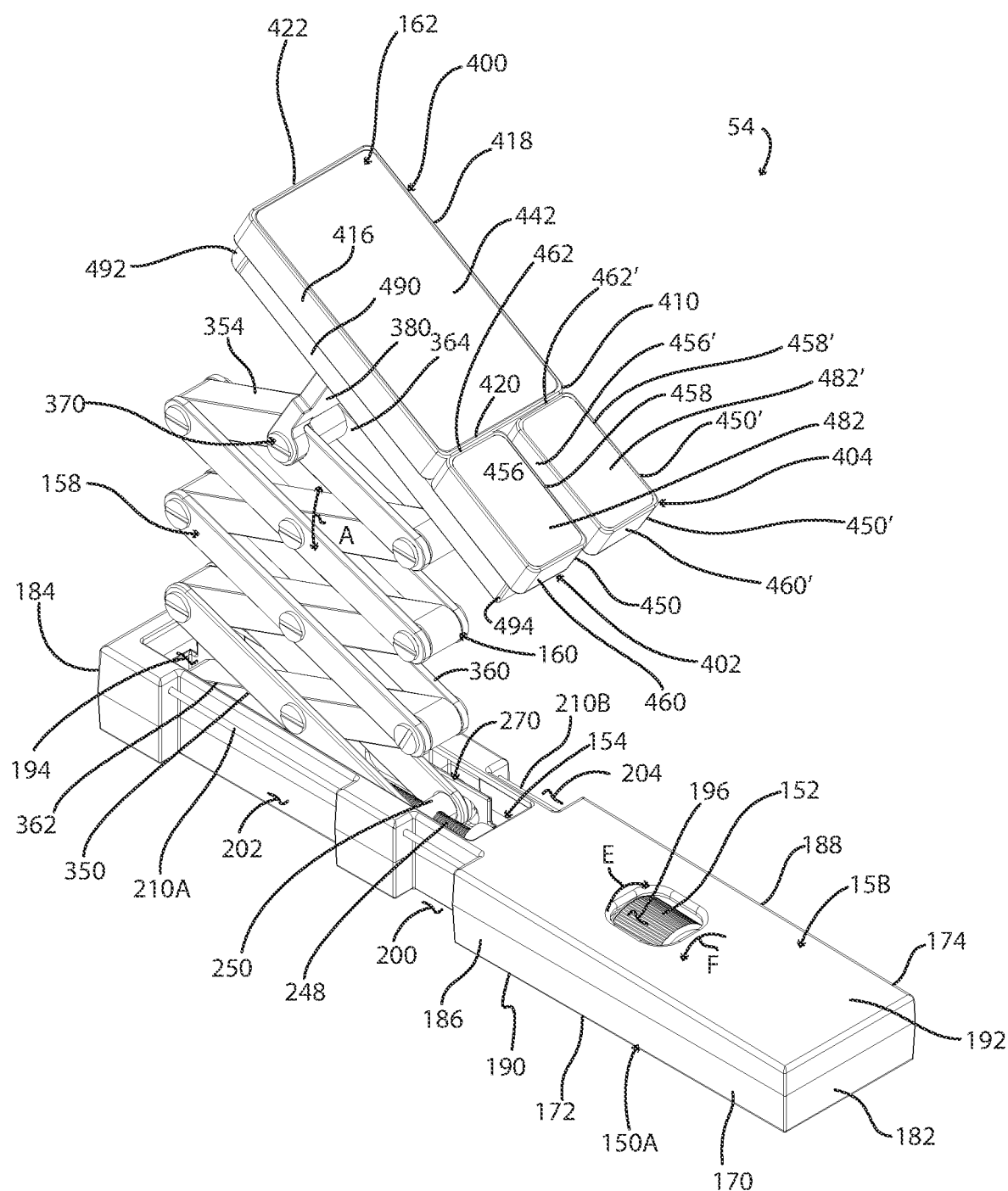
FIG. 18 is an upper left perspective view of the embodiment of FIG. 17.
Figure 19:
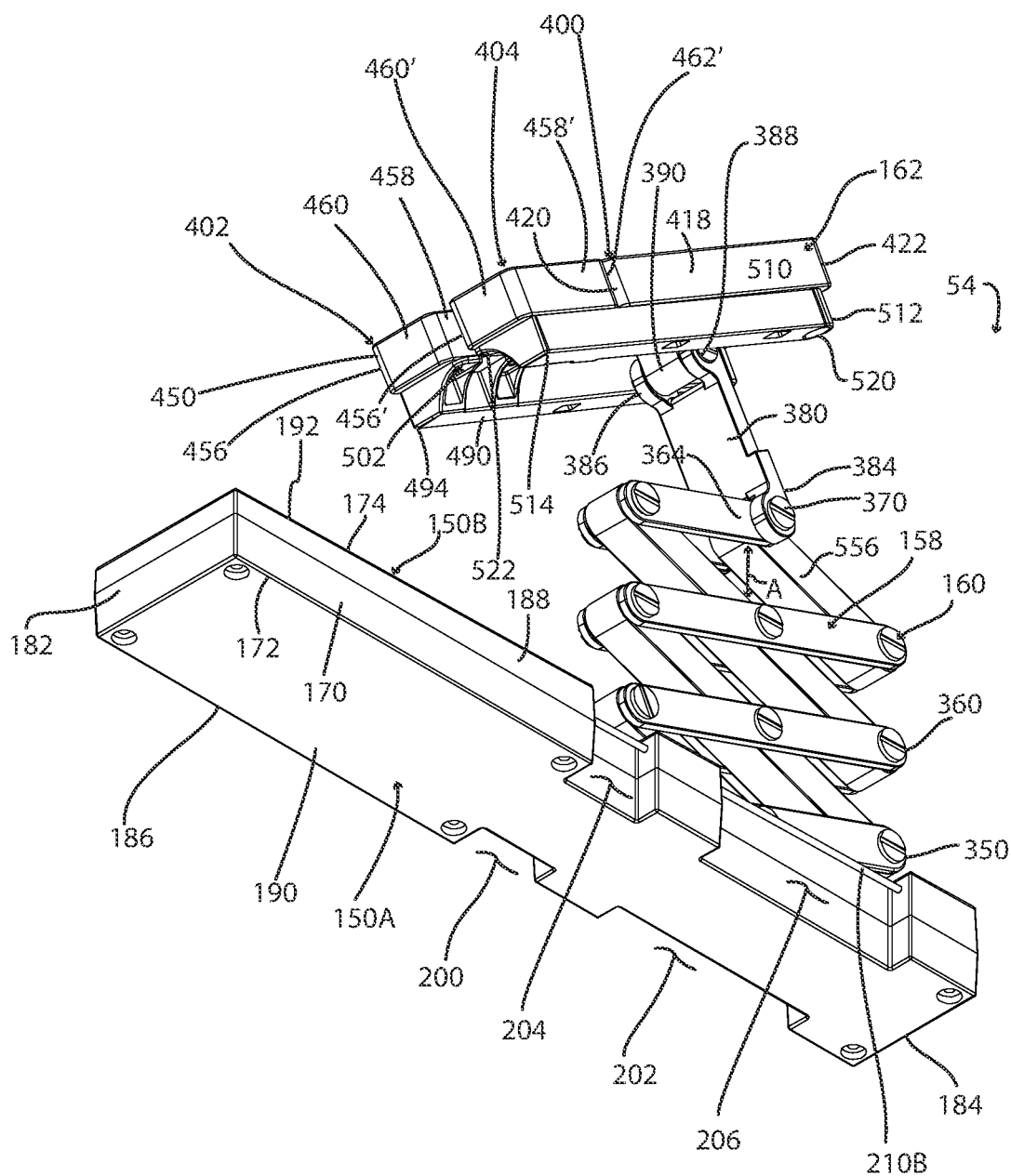
FIG. 19 is a lower right perspective view of the embodiment of FIG. 17.
Figure 20:
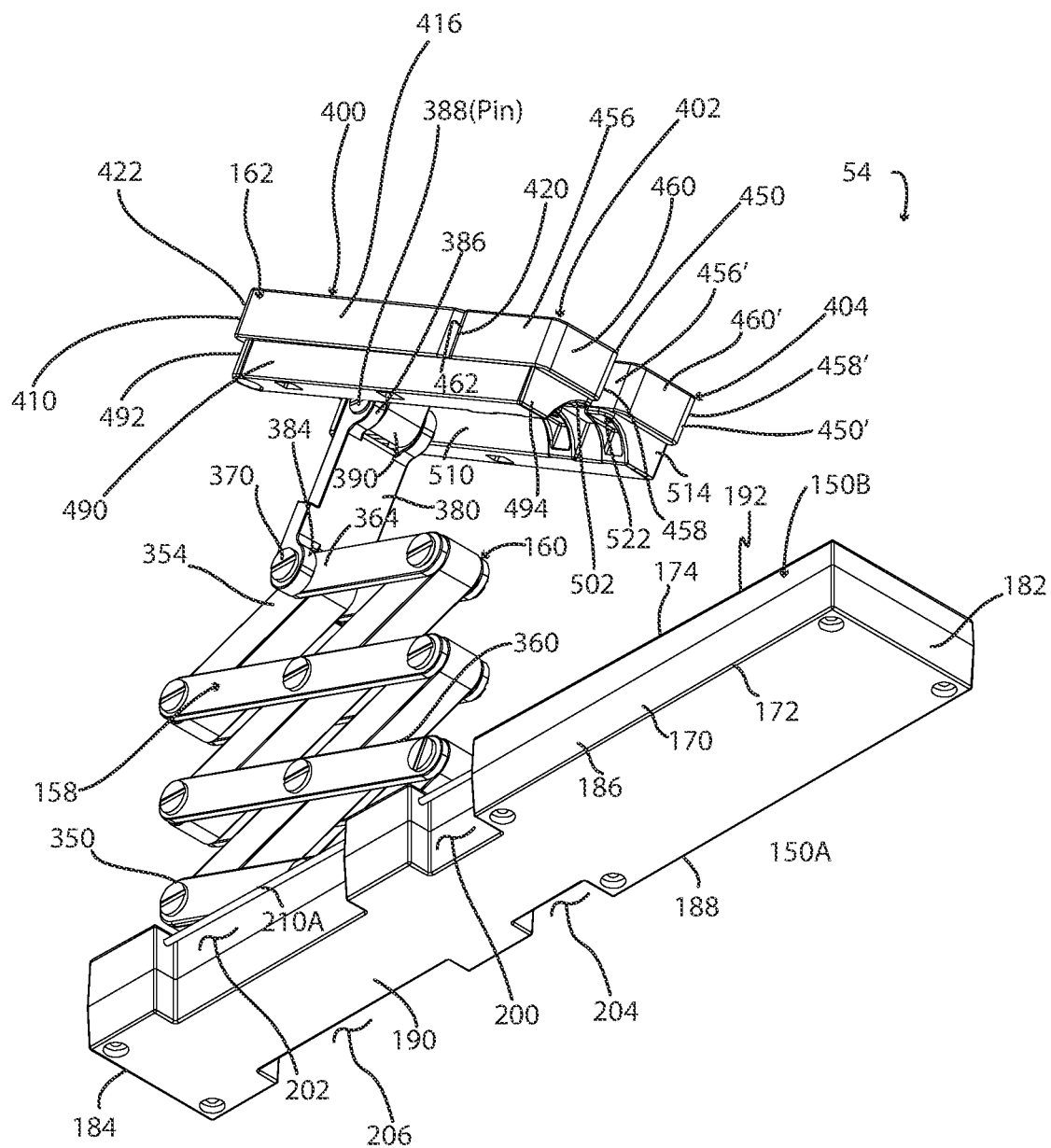
FIG. 20 is a lower left perspective view of the embodiment of FIG. 17.

As explained above, the trigger 152, a standard two-way rotary switch, is electrically coupled to the motor speed controller 240 and the motor 242 conventionally. In FIGS. 17 and 18, the motor 242 activates, rotating the drive shaft 244 and its connected shank 248 clockwise when a user rotates the trigger 152 in a first direction, in this embodiment clockwise indicated by arrow E, out of the trigger's 152 starting or neutral position. The motor 242 activates, rotating the drive shaft 244 and its connected shank 248 counterclockwise when a user rotates the trigger 152 in a second direction, in this embodiment counterclockwise indicated by arrow F, out of the trigger's 152 starting or neutral position. The trigger 152 is configured to assume its starting or neutral position when a user releases it, deactivating the motor 242. The motor 242 is configured to lock or otherwise secure the drive shaft 244 and its connected shank 248 from rotating when the motor 242 deactivates. The controller 240 limits the motor's 242 output, limiting the speed at which the motor 242 can rotate drive shaft 24 when the motor 242 actuates.

In FIGS. 17, 18, 25, and 26, the stand's 158 linkage 160 is coupled between the holder 162 and the housing's 150 carriage 270 and power drive mechanism 154, extends upright from the housing's 150 carriage 270 to the holder 162 over the housing's 150 carriage 270, and is configured to extend and retract in the directions of double arrow A for raising and lowering the holder 162 over the housing's 150 carriage 27. FIGS. 17, 18 and 25 show the linkage 160 retracted supporting the holder 162 at a lowered position over the housing's 150 carriage 270. FIG. 26 show the linkage 160 extended supporting the holder 162 at a raised position over the housing's 150 carriage 270.

The linkage 160 is a scissor mechanism. The scissor mechanism 160 is efficient and reliable and, in a manner known per se, composed of multiple scissor members or supports 350 and 360 connected pivotally by appropriate pivots. The support 350 is the scissor mechanism's 160 first or inner support, and the support 360 is the scissor mechanism's 160 second or outer support. The supports 350 and 360 include bars connected pivotally by pivots or joints, standard screw binding posts in this example, the bars forming a series of crosses extending between lower ends 352 and 362 and the upper ends 354 and 364 of the respective supports 350 and 360. The pin 250 pivotally connects the support's 350 lower end 352 to the carriage 270 and, thus, to the housing 150 in the assembled stand assembly 54, the pin 250 being part of or otherwise an extension of the lower end 352 between the carriage's 270 walls 280 and 300. A pivot 366, a standard screw binding post, pivotally connects the support's 360 lower end 362 to the carriage 270 at a fixed or stationary point proximate to the rear stub wall 284 at the carriage's rear end 354 and, thus, to the housing 150 proximate to its rear end 184 in the assembled stand assembly 54, the lower end 362 being between the carriage's 270 walls 280 and 300. A pivot 370, also a standard screw binding post, pivotally connects the upper ends 354 and 364 of the respective supports 350 and 360. In FIGS. 25 and 26, the various bars of the scissor mechanism 160 are parallel to each other, and the carriage's 270 walls 280 and 300. The scissor mechanism 160 extends upright from its lower ends 352 and 362 between the carriage's 270 walls 280 and 300 to its upper ends 354 and 364 connected pivotally by pivot 370. In the assembled stand assembly 154 in FIGS. 17 and 18, the scissor mechanism 160 extends upright through the linkage opening 194 from its lower ends 352 and 362 between the carriage's 270 walls 280 and 300 to its upper ends 354 and 364 connected by pivot 370.

The pin 250, how it pivotally connects the lower end 352 and mounts reciprocally to the carriage 270 between a first or forward position adjacent to the inner end walls 290 and 310 and a second or rearward position adjacent to the outer end walls 292 and 312, the pivots 360 and 370, and the remaining pivots of the scissor mechanism 160 enable the angle at which the various bars of respective scissor supports 350 and 360 are relative to the housing 150 and its carriage 27 and the upper ends 354 and 364 to be varied, extending and retracting the scissor mechanism 160 relative to the housing 150 and its carriage 270. FIGS. 17-20 and 25 show the scissor mechanism 160 retracted to a lowered position of the holders 162 and FIG. 26 shows the scissor mechanism extended to a raised position of the holders 162. When the scissor mechanism 160 is retracted in FIGS. 17-20 and 25, the pin 250 and lower end 352 assembly is in the pin's 250 first or forward position adjacent to the inner end walls 290 and 310, distanced away from the scissor support's 360 lower end 362 in FIG. 25. Moving the pin 250 and lower end 352 assembly from its first or forward position to the pin's 250 second or rearward position in FIG. 26 adjacent to the outer end walls 292 and 312 toward the scissor support's 360 stationary lower end 362 in response to rotating the shank 248 clockwise via actuating the motor 242 by rotating the trigger 152 clockwise in the direction of arrow E in FIGS. 17 and 18 closes the distance between the lower ends 352 and 362, elongating the scissor mechanism 160 by elongating the crossing pattern of the various bars of the scissor supports 350 and 360. Moving the pin 250 and lower end 352 assembly from its second or rearward position in FIG. 26 to its first or forward position in FIGS. 17-20 and 25 in response to rotating the shank 248 counterclockwise via actuating the motor 242 by rotating the trigger 152 counterclockwise in the direction of arrow F in FIGS. 17 and 18 opens the distance between the lower ends 352 and 362, retracting the scissor mechanism 160 by collapsing the crossing pattern of the various bars of the scissor supports 350 and 360. The inner end walls 290 and 310 limit the pin 250 from moving forwardly therebeyond toward the housing's 150 front end 182, limiting the scissor mechanism 160 from further retracting beyond a lowermost position the holder 162. The outer end walls 292 and 312 limit the pin 250 from moving rearwardly therebeyond toward the housing's 150 rear end 184, limiting the scissor mechanism 160 from further extending beyond an uppermost position of the holder 162. Accordingly, selective actuation of the trigger 152 automatically activates the power drive mechanism 154, extending and retracting the scissor mechanism 160 for raising and lowering the holder 162.

In FIGS. 17-20 and 25-30, the holder 162 includes a central, main, primary, or first support 400, two auxiliary or secondary supports, namely, a second support 402 and a third support 403, and two arms 490 and 510. The first support 400 coupled to the scissor mechanism 160 is larger than the second and third supports 402 and 404, which are identical in size, shape, and construction. The arms 490 and 510 are identical, being the mirror image of each other.

Figure 27:
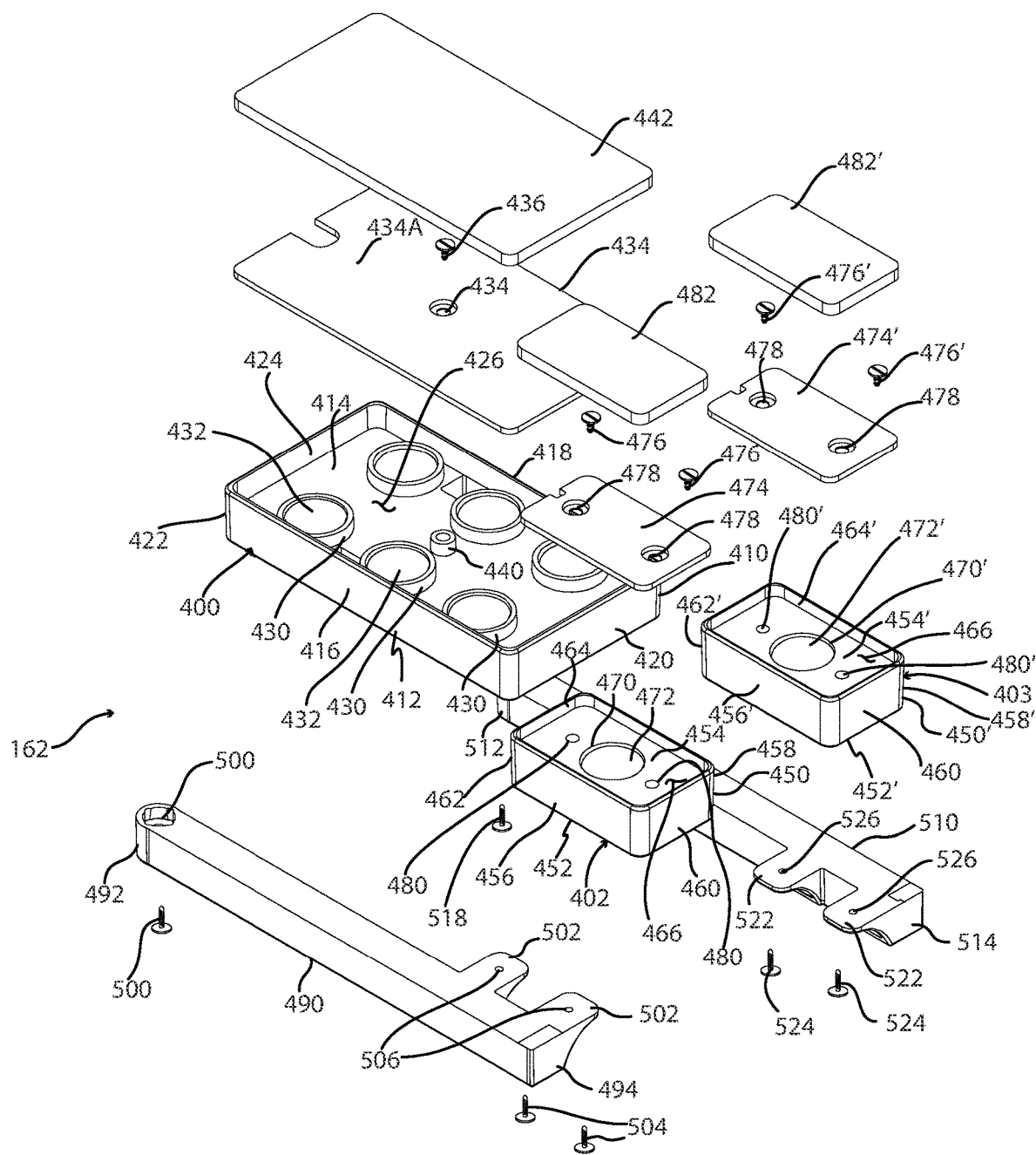
FIG. 27 is an exploded view of the holder first illustrated in FIG. 1.

Referring to FIG. 27 and to FIGS. 17-20 and 25-30 in relevant part, the first support 400, rectangular in this example, includes a base or block 410, including a lower side 412, an upper side 414, and a perimeter, defined by opposed parallel left and right sides 416 and 418 extending between comparatively shorter opposed parallel inner and outer ends 420 and 422. The block 410 extends upright from its lower side 412 to its upper side 414. A continuous sidewall 424 extends upright from the upper side 414 at the block's 410 perimeter, forming the block's 410 recess or cavity 426. The upper side 414 has a pattern of identical receptacles 430, six in this example. Each receptacle 430 is open upwardly and holds a magnet 432. The receptacles 430 open the magnets 432 to a cover 434 fit in the cavity 426 over the upper side 414, the receptacles 430, and their magnets 432, closing cavity 426 and enclosing its contents. A fastener 436 secures the cover 434 to the block 410. The fastener 436, a standard screw, extends through an appropriate hole 440 through the cover 434 from its outer side 434A and secures a threaded socket 440 in the block's 410 upper side 414 threadably. An upwardly-facing pad 442 of natural or synthetic rubber or other like or similar elastomer is attached to the cover's 434 outer side 434A with a suitable adhesive, isolating and protecting the cover's 434 outer side 434A. The magnets 422 are sufficiently strong, enabling them to transmit their influence on the cover 424, enabling them to secure a tablet computer magnetically. Accordingly, the first support 440 is magnetic, configured to secure a tablet computer magnetically discussed below. The pad 442 holds the tablet computer frictionally, resisting it from sliding across the pad 424. Support 400 can be configured with more or less than six receptacles 430 and corresponding magnets 432 of varying size.

The second support 402, smaller than the first support 400 and rectangular in this example, includes a base or block 450, including a lower side 452, an upper side 454, and a perimeter, defined by opposed parallel left and right sides 456 and 458 extending between comparatively shorter opposed parallel inner and outer ends 460 and 462. The block 450 extends upright from its lower side 452 to its upper side 454. A continuous sidewall 464 extends upright from the upper side 454 at the block's 450 perimeter, forming the block's 450 recess or cavity 466. The upper side 454 has a central socket 470. The socket 470 opens upwardly and holds a magnet 472. The socket 470 opens the magnet 472 to a cover 474 fit in the cavity 466 over the upper side 454, the socket 470, and its magnets 472, closing cavity 466 and enclosing its contents. Fasteners 476 secure the cover 474 to the block 450. The fasteners 476, standard screws, extend through appropriate holes 478 through the cover 474 from its outer side 474A and secure threaded holes 480 in the block's 450 upper side 454 threadably. An upwardly-facing pad 482 of the same material as pad 442 is attached to the cover's 474 outer side 474A with a suitable adhesive, isolating and protecting the cover's 474 outer side 474A. The magnet 472 is sufficiently strong, enabling it to transmit its influence on the cover 474 enabling it to secure a tablet computer magnetically. Accordingly, the second support 440 is magnetic, configured to secure a tablet computer magnetically discussed below. The pad 482 holds the tablet computer frictionally, resisting it from sliding across the pad 482. Support 402 can be configured with more than one socket 470 and corresponding magnet 472 of varying size.

The third support 404 is identical to the second support 402, and shares block 450', lower side 452', upper side 454', the perimeter defined by left and right sides 456' and 458' and outer ends 460' and 462', continuous sidewall 464', recess or cavity 466', socket 470', magnet 472', cover 474', outer side 474A', fasteners 476', holes 478' and 480', and pad 482'. The second support 402 and the third support 404 share common reference numerals, the third support's 404 reference numerals including prime ("'") symbols for clarity.

Arm 490 is elongate, longitudinally straight, and extends from an inner end 492, connected to the block 410 hingedly, to a free outer end 494 connected to and supporting the second support 402. A fastener 498, a threaded fastener in this example, extends through a hole 500 through the arm's 490 inner end 492 and threads into the block 410 through its lower side 412, hinging the inner end 492 to the block's 410 lower side 412 near the outer end 422 and adjacent to the block's 310 side 416, enabling the arm 490 to turn, pivot, or otherwise rotate at its inner end 492. The arm's 490 free end 494 has brackets 502 secured to the block's 450 lower side 452 with fasteners 504. The fasteners 504, standard screws, extend through appropriate holes 506 through the respective brackets 502 and thread into the block 450 through its lower side 452, securing the second support 402 to the arm's 490 free end 494 atop the brackets 502.

Arm 510 is elongate, longitudinally straight, and extends from an inner end 512, connected to the block 410 pivotally or otherwise rotational, to a free outer end 514 connected to and supporting the third support 404. A fastener 518, a threaded fastener in this example, extends through a hole 520 (FIGS. 19 and 29) through the arm's 510 inner end 512 and threads into the block 410 through its lower side 412, hinging the inner end 512 to the block's 410 lower side 412 near the outer end 422 and adjacent to the block's 310 side 418, enabling the arm 510 to turn, pivot, or otherwise rotate at its inner end 512. The arm's 510 free end 514 has brackets 522 secured to the block's 450' lower side 452' with fasteners 524. The fasteners 524, standard screws, extend through appropriate holes 526 through the respective brackets 522 and thread into the block 450' through its lower side 452', securing the third support 404 to the arm's 510 free end 514 atop the brackets 522.

Figure 28:
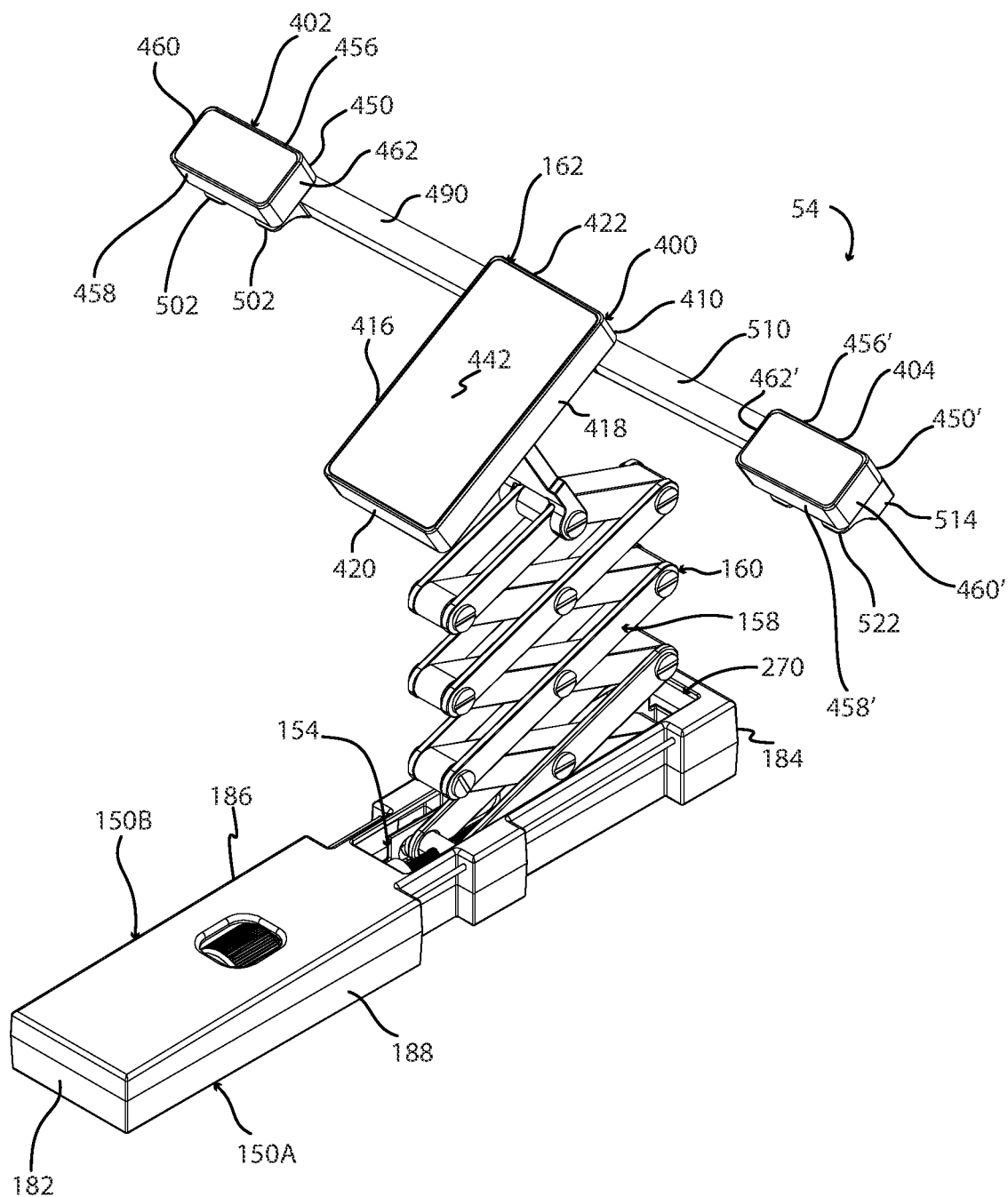
FIG. 28 is a view corresponding to FIG. 17, illustrating the holder expanded.
Figure 29:
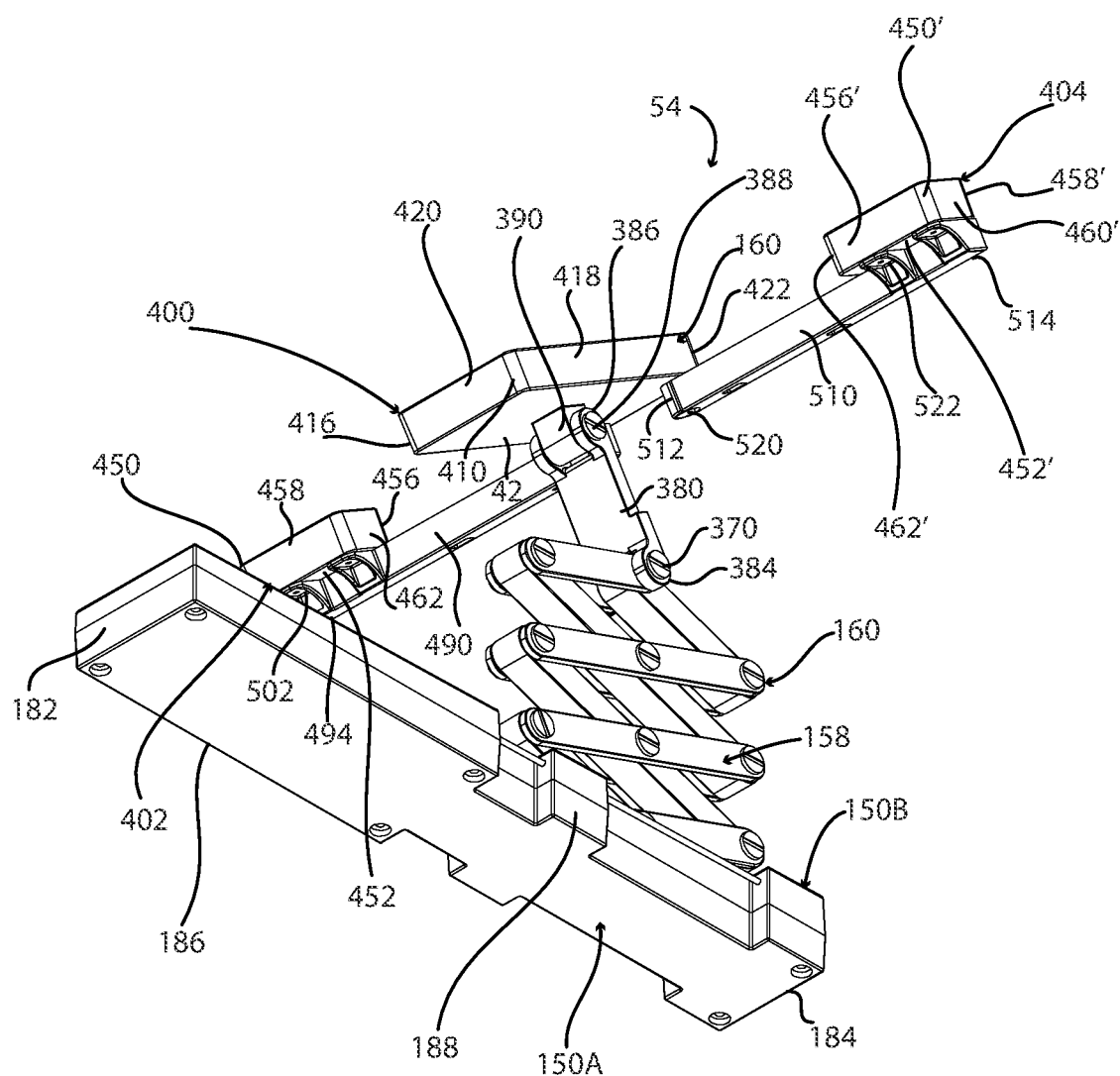
FIG. 29 is a lower right view of the embodiment of FIG. 28.
Figure 30:
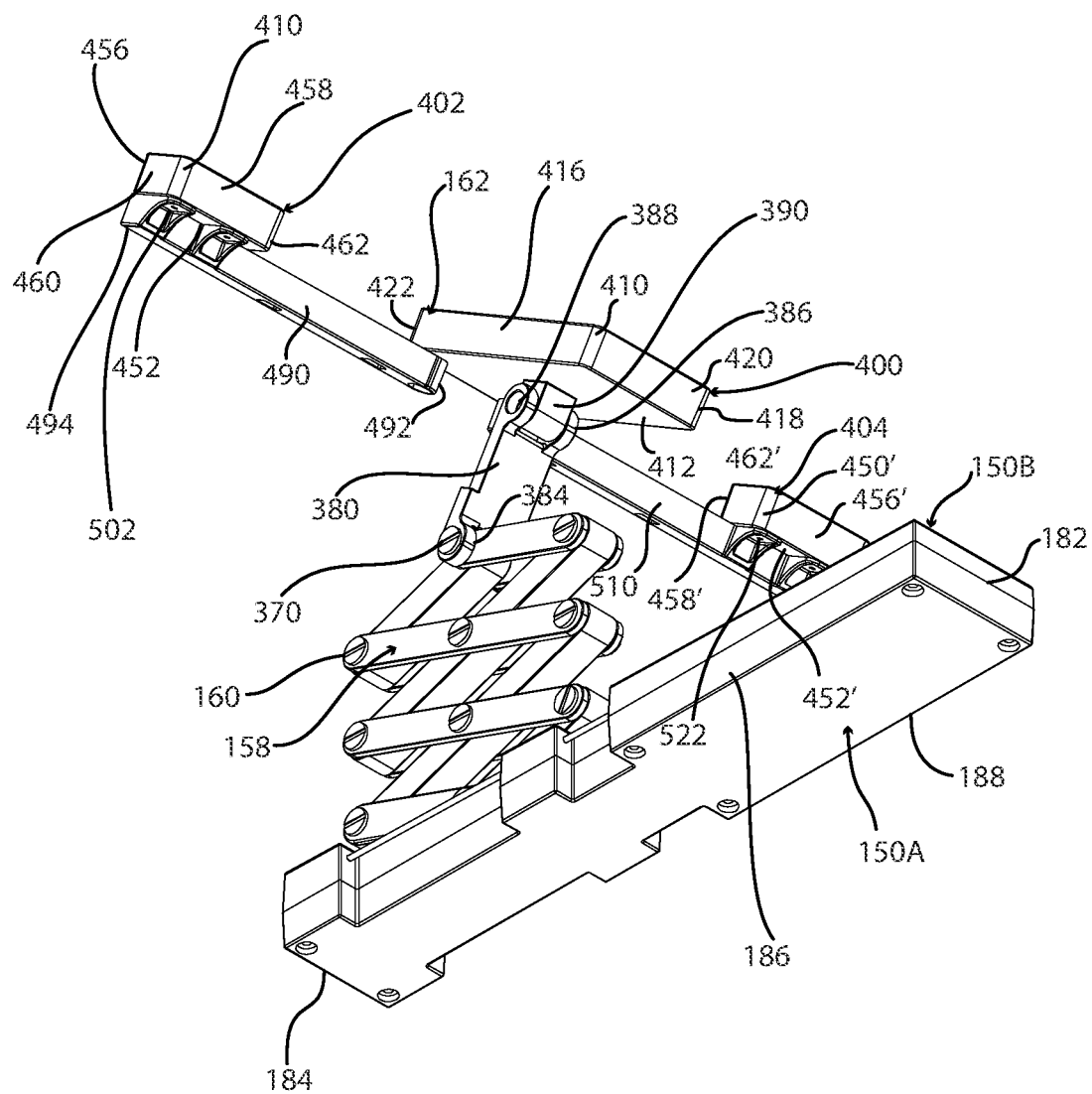
FIG. 30 is a lower left perspective view of the embodiment of FIG. 28.

The arm 490 pivots about its inner end 492 hinged or otherwise attached pivotally to the block 410 in the directions of double arrow G in FIGS. 25 and 26 between a first, collapsed or stored position in FIGS. 17-20, 25, and 26 and a second, deployed or expanded position in FIGS. 28-30. The arm 490, when in its stored position in FIGS. 17-20, 25, and 26, extends under the block's 410 lower side 412 and longitudinally with the block's 410 left side 416 from the arm's 490 inner end 492 near the block's 410 outer end 422 to and beyond the block's 410 inner end 420 to the second support 402 mounted atop the arm's 490 brackets 502, juxtaposing the second support 402 in its stored position with the first support's 402 inner end 420. The second support 402 extends forward from its outer end 462 juxtaposed with the first support's 400 inner end 420 to its inner end 460 and upwardly-facing pads 442 and 482 are coplanar when the second support 402 is in its stored position. The arm 490, when pivoted to its deployed position in FIGS. 28-30, extends laterally outwardly from the left side 416 of the first support from the inner end 492 adjacent to the first support's 400 outer end 422 to the arm's 490 brackets 502 supporting the second support 402 at its deployed position spaced laterally outboard of the first support's 400 left side 416. The second support 402 extends laterally outward away from the first support's 400 left side 416 from its outer end 462 to its inner end 460, and pads 442 and 482 are coplanar when the second support 402 is in its deployed or expanded position. Accordingly, the second support 402 is carried by arm 490 mounted to the first support 400 for movement between the stored position of the second support 402 juxtaposed with the first support 400 and the deployed position of the second support 402 outboard of the left side 416 of the first support 400.

The arm 510 pivots about its inner end 512 hinged or otherwise attached pivotally to the block 410 in the directions of double arrow H in FIGS. 25 and 26 between a first, collapsed or stored position in FIGS. 17-20, 25, and 26 and a second, deployed or expanded position in FIGS. 28-30. The arm 510, when in its stored position in FIGS. 17-20, 25, and 26, extends under the block's 410 lower side 412 and longitudinally with the block's 410 right side 418 from the arm's 510 inner end 512 near the block's 410 outer end 422 to and beyond the block's 410 inner end 420 to the third support 404 mounted atop the arm's 510 brackets 522, juxtaposing the third support 404 in its stored position with the first support's 402 inner end 420. The third support 404 extends forward from its outer end 462' juxtaposed with the first support's 400 inner end 420 to its inner end 460' and pads 442 and 482' are coplanar when the third support 404 is in its stored position. The arm 510, when pivoted to its deployed position in FIGS. 28-30, extends laterally outwardly from the right side 418 of the first support 400 from the inner end 512 adjacent to the first support's 400 outer end 422 to the arm's 510 brackets 522 supporting the third support 404 in its deployed position spaced laterally outboard of the first support's 400 right side 418. The third support 404 extends laterally outward away from the first support's 400 right side 418 from its outer end 462' to its inner end 460', and pads 442 and 482' are coplanar when the third support 404 is in its deployed or expanded position. Accordingly, the third support 404 is carried by arm 51 mounted to the first support 400 for movement between a stored position of the third support 404 juxtaposed with the first support 400 and a deployed position of the third support 402 outboard of the right side 418 of the first support 400.

The holder 162 is collapsed when the arms 490 are in the stored positions of the second and third supports 402 and 404 and is expanded when the arms are deployed to the deployed positions of the second and third supports 402 and 404. The arm 490 and 510, when in their stored positions in FIGS. 17-20, 25, and 26 are parallel relative to one another. The second and third supports 402 and 404, when in their stored positions, are parallel, side-by-side or otherwise beside one another and their respective sides 458 and 456' are longitudinally juxtaposed. The arm 490 and 510, when in their deployed positions in FIGS. 28-30, are coaxial. When the second support 402 is in its deployed position spaced laterally outboard of the first support's 400 left side 416 and the third support is in its deployed position spaced laterally outboard of the first support's 400 right side 418, the second and third supports 402 and 404 are spaced apart axially. The pads 442, 482, and 482' are coplanar at all times. A user rotates the arms 490 and 510 between their stored and deployed positions by hand.

As previously explained, a link or coupling 380 couples the upper ends 354 and 364 to the overlying holder 162. In FIGS. Referring to FIGS. 19, 20, 29, and 30, the coupling 380 is an elongate body including a lower clevis 384 and an upper clevis 396. The pin 370 pivotally or otherwise rotationally connects the upper ends 354 and 364 to the lower clevis 384. A pin 388 pivotally or otherwise rotationally connects the upper clevis 386 to a lug 390 affixed to and depending downward from the lower side 412 of the first support's 402 block 410. The lug 390 is centered between the block's 410 sides 416 and 418 and is adjacent to the block's 410 outer end 412.

Referring back to FIGS. 1 and 2, the stand assembly 54 is between and separates the keyboard components 60 and 80, illustrated in their operative positions. The housing 150 extends upward from its horizontal bottom 190 to horizontal top 192, the linkage opening 194, the trigger opening 196 open to the trigger 152 between linkage opening 194 and the housing's 150 front end 182, and the linkage 160, extending upright to the holder 162 from the housing 150 through the linkage opening 194. The various bars of the scissor mechanism 160 are parallel to the right side 68 of the left keyboard component 60 and the left side 86 of the right keyboard component 80. The keyboard component's 60 right side 68 and the housing's 150 left side 186 are parallel and connected pivotally. The right side 68 extends from the front end 62 in line with the front end 182 at the front end of the keyboard to the rear end 64 in line with the rear end 184 at the rear end of the keyboard. The keyboard component's 80 left side 86 and the housing's 150 right side 188 are parallel and connected pivotally. The right side 86 extends from the front end 82 in line with the front end 182 at the front end of the keyboard 52 to the rear end 84 in line with the rear end 184 at the rear end of the keyboard 52. The keys 76 and 96 are on either side of the linkage opening 194 and the stand 158. The wrist rests 74 and 94 are on either side of the trigger opening 196 and the trigger 152.

The linkage 160 supports the holder 162 over the keyboard 52 between the keyboard components 60 and 80 at an intermediate position between the front of the keyboard 52, defined by the keyboard component's 60 and 80 respective front ends 62 and 82 and the housing's 150 front end 182, and the rear end of the keyboard 52, defined by the keyboard component's 60 and 80 respective rear ends 64 and 84 and the housing's 184 rear end. The first support 400 extends longitudinally from its front end 420, directed forward in the direction the housing's 150 front end 182, to its rear end 422, directed rearward in the direction of the housing's 150 rear end 184, and laterally from its left side 416, in the direction of keyboard component 60, to its right side 418, in the direction of keyboard component 80. The arm 490 and 510 are in their stored positions in FIGS. 1 and 2, storing the second and third supports 402 and 404 in their stored positions juxtaposed with one another and the first support's 400 front end 420 and extending forward from the first support's 400 front end 420 toward the housing's 150 front end 182. A user may rotate the arm 490 in the directions of double arrow G about its inner end 492 hinged to the block 410 between the second support's 402 stored position in FIGS. 1 and 2 and its deployed position in FIGS. 31 and 32, spaced laterally outboard from the first support's 400 left side 416 and over the keyboard component's 60 keys 76. A user may also rotate the arm 510 in the directions of double arrow H about its inner end 512 hinged to the block 410 between the third support's 402 stored position and its deployed position in FIGS. 31 and 32, spaced laterally outboard from the first support's 400 right side 418 and over the keyboard component's 80 keys 96.

Figure 33:
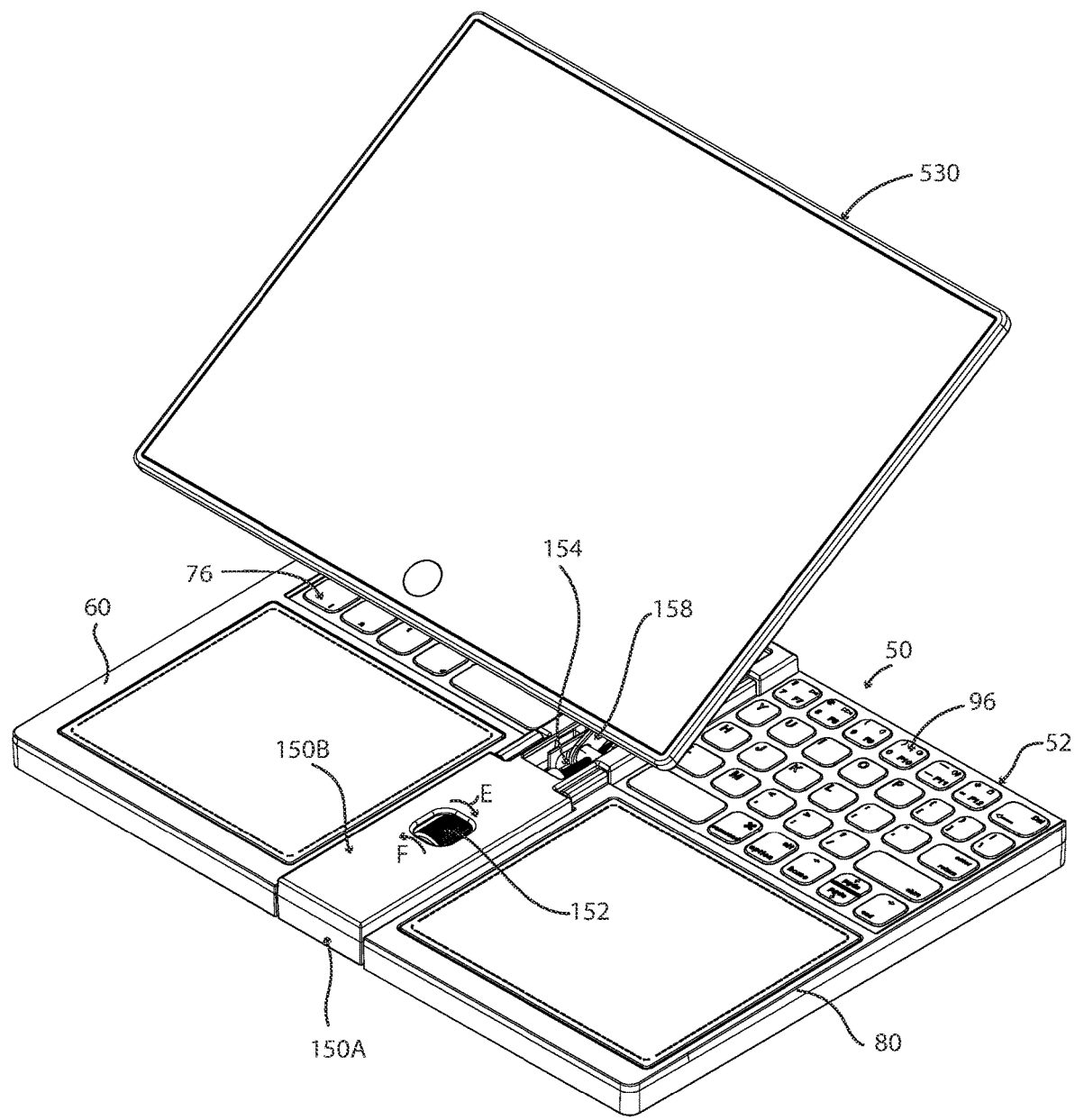
FIG. 33 is a view corresponding to FIG. 1, illustrating a tablet computer supported by the stand.
Figure 34:
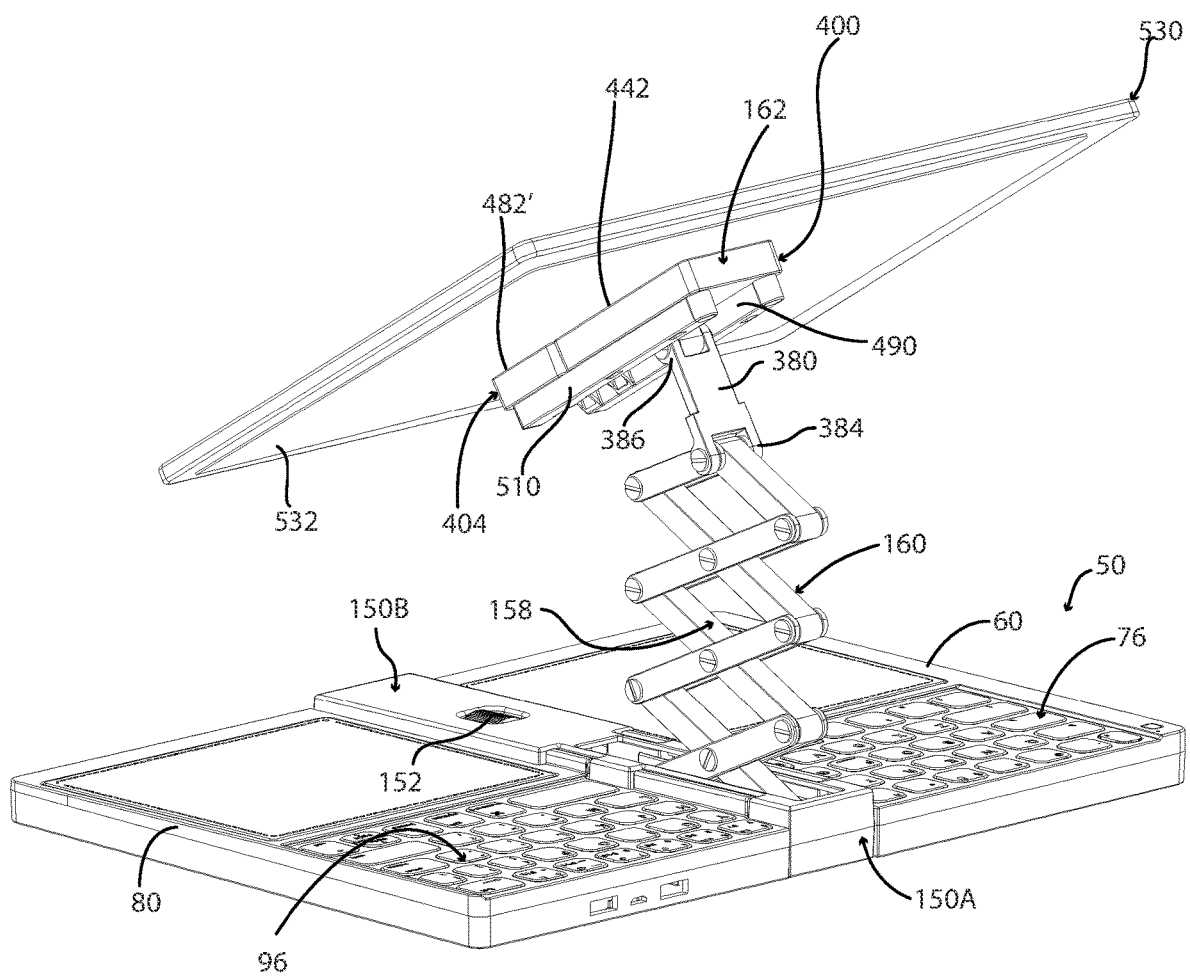
FIG. 34 is a left rear perspective view of the embodiment of FIG. 33.
Figure 35:
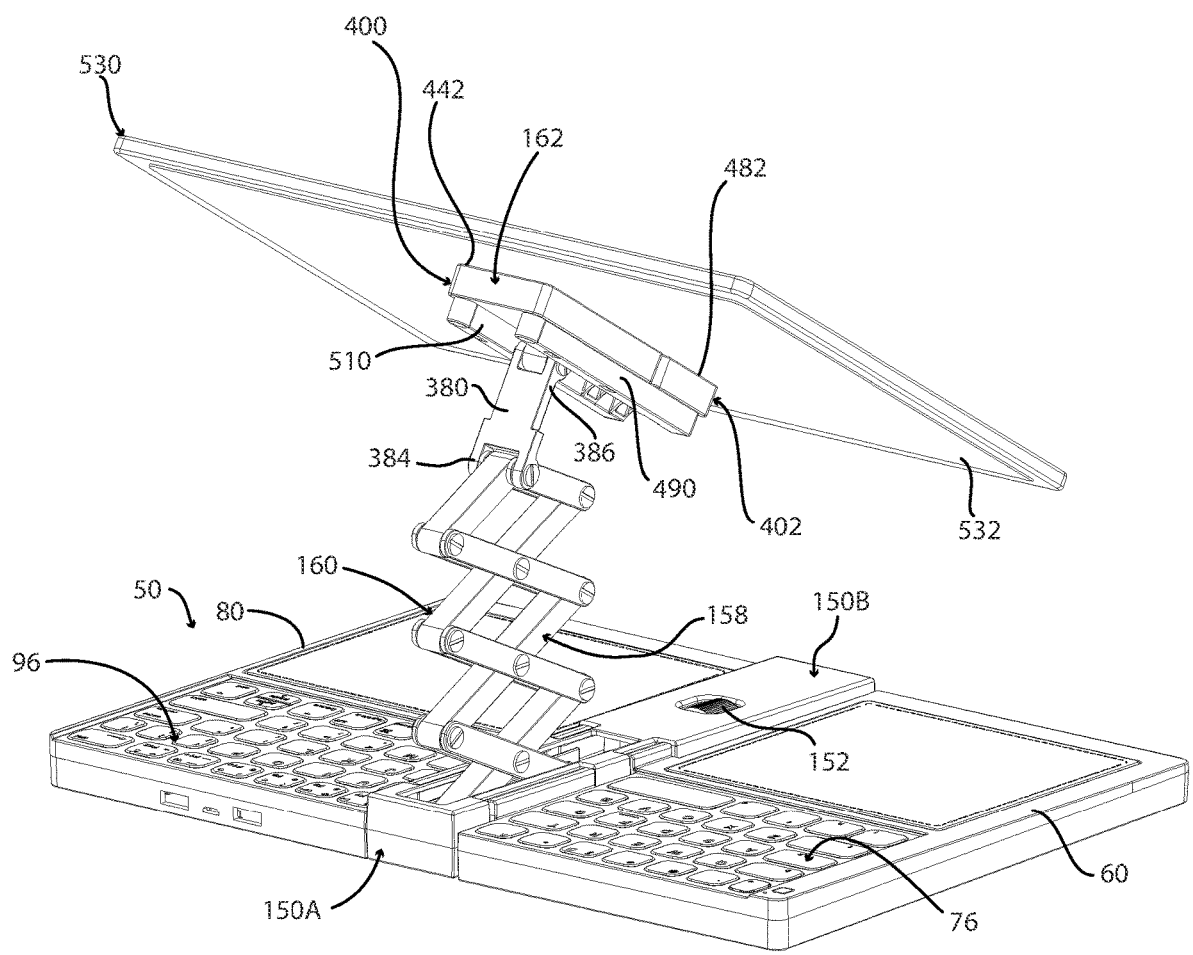
FIG. 35 is a right rear perspective view of the embodiment of FIG. 34.

In their in-use or operative positions in FIGS. 1-7, the keyboard components 60 and 80 extend outward laterally from the housing's 150 respective left and right sides 186 and 188. The upwardly-facing keyboard component's 60 wrist rest 74 is available to receive the palmar side of the user's left wrist while he types on the upwardly-facing keys 76 with his left-hand fingers to the left of the stand assembly 54. The keyboard component's 80 upwardly-facing wrist rest 94 is available to receive the palmar side of the user's right wrist while he types on the upwardly-facing keys 96 with his right-hand fingers to the right of the stand assembly 54. The stand's 158 linkage 160 extends upright from the housing 150 through the linkage opening 194 to the holder 162 over the housing 150 and the keyboard 52. FIGS. 1-7 show the linkage 160 retracted setting the holder 162 to a lowered position over the housing 150 and keyboard 52 and the arms 490 and 510 pivoted to the stored positions of the respective second and third supports 402 and 404 relative to the first support 400. FIGS. 33-35 show a tablet computer 530 supported on the stand 158, on the collapsed holder's 162 pads 442, 482, and 482' of the respective first, second, and third supports 400, 402, and 404 in FIGS. 34 and 35, over the housing 150 and the keyboard 52, the linkage 160 in FIGS. 34 and 35 retracted locating the tablet 530 at the holder's 162 lowered position over the housing 150 and the keyboard 52. A user may work on the keyboard component's 60 upwardly-facing keys 76 and the keyboard component's 80 upwardly-facing keys 96 while viewing the tablet computer 530 at comfortable angle. In FIGS. 34 and 35, the user may orient the tablet computer 530 at a comfortable angle by selectively pivoting the coupling 380 and the holder 162 about the respective lower and upper clevises 384 and 386. He may also actuate the power drive mechanism 154 to selectively raise and lower the tablet computer 530 supported atop the holder 162 by selectively rotating the trigger 152 clockwise in the direction of arrow E in FIGS. 1, 2 and 33 to extend the linkage 160 to raise the holder 162 and the tablet computer 530 it supports over the housing 150 and the keyboard 52 and counterclockwise in the direction of arrow F in FIGS. 1, 2 and 33 to retract the linkage 160 to lower the holder 162 and the tablet computer 530 it supports over the housing 150 and the keyboard 150. The user actuates the trigger 152 by hand to selectively retract and extend the scissor mechanism 160 for selectively raising and lowering the holder 162 to a chosen height over the keyboard 52 comfortable for viewing the tablet computer 530. The magnetic first, second, and third supports 400, 402, and 403 of the holder 162 magnetically secure a ferromagnetic plate 532 fixed centrally to the back of the tablet computer 530 in FIGS. 34 and 35 concurrently, while their respective coplanar pads 442, 482, and 482' concurrently frictionally resist the plate 532 from sliding thereacross when the holder is collapsed and expanded.

Figure 31:
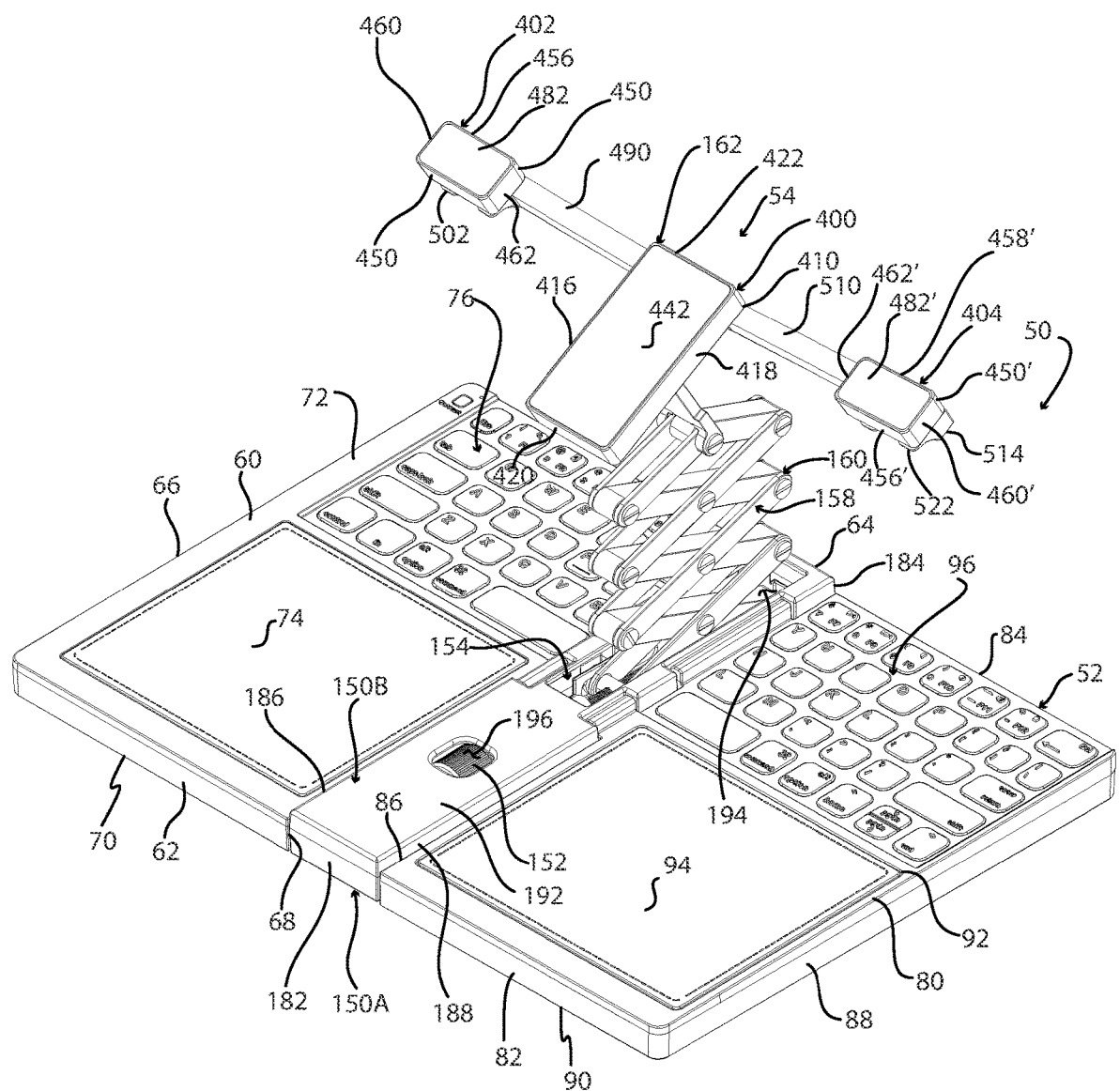
FIG. 31 is a view corresponding to FIG. 1, illustrating the holder expanded.
Figure 32:
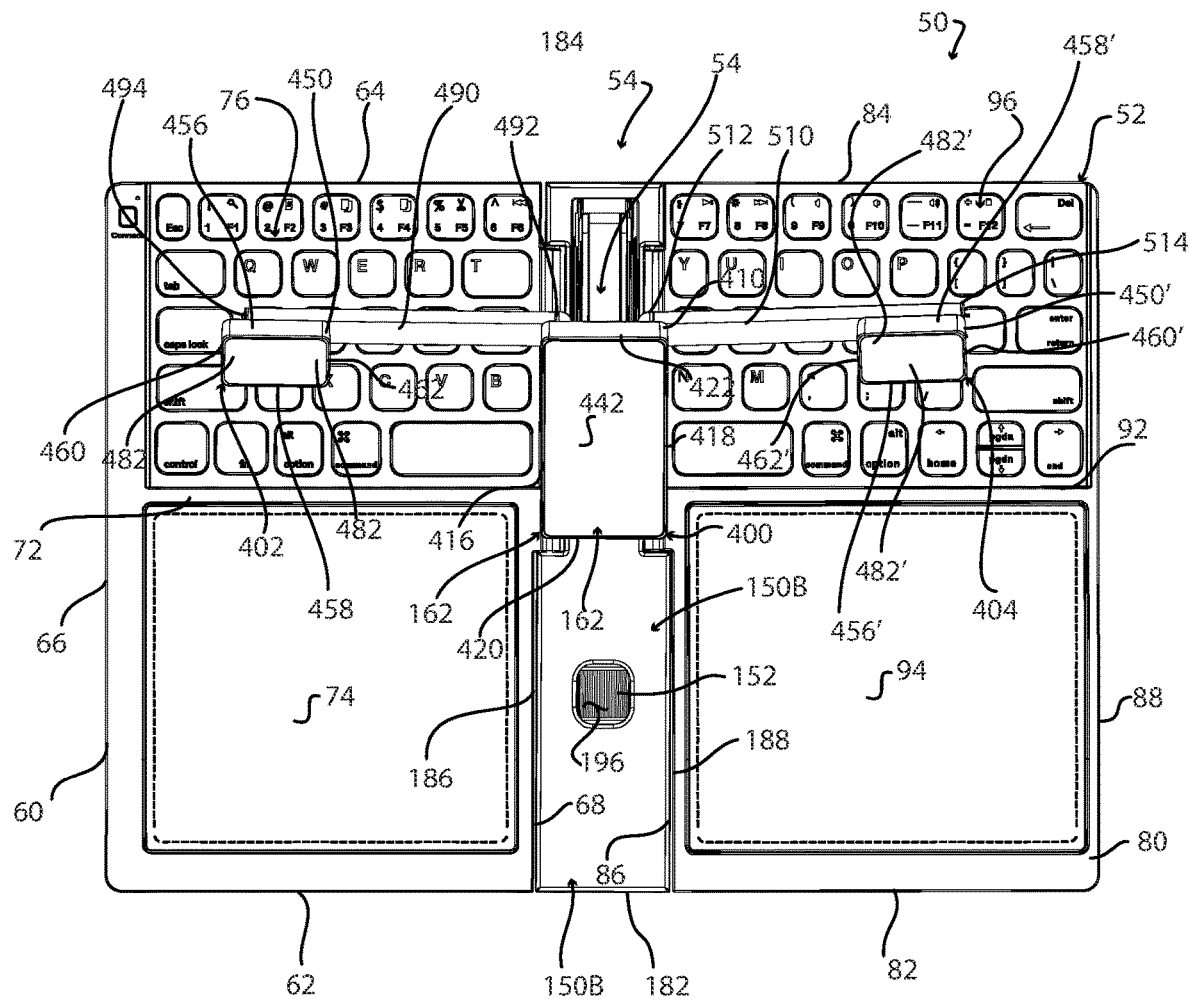
FIG. 32 is a top plan view of the embodiment of FIG. 31.
Figure 36:
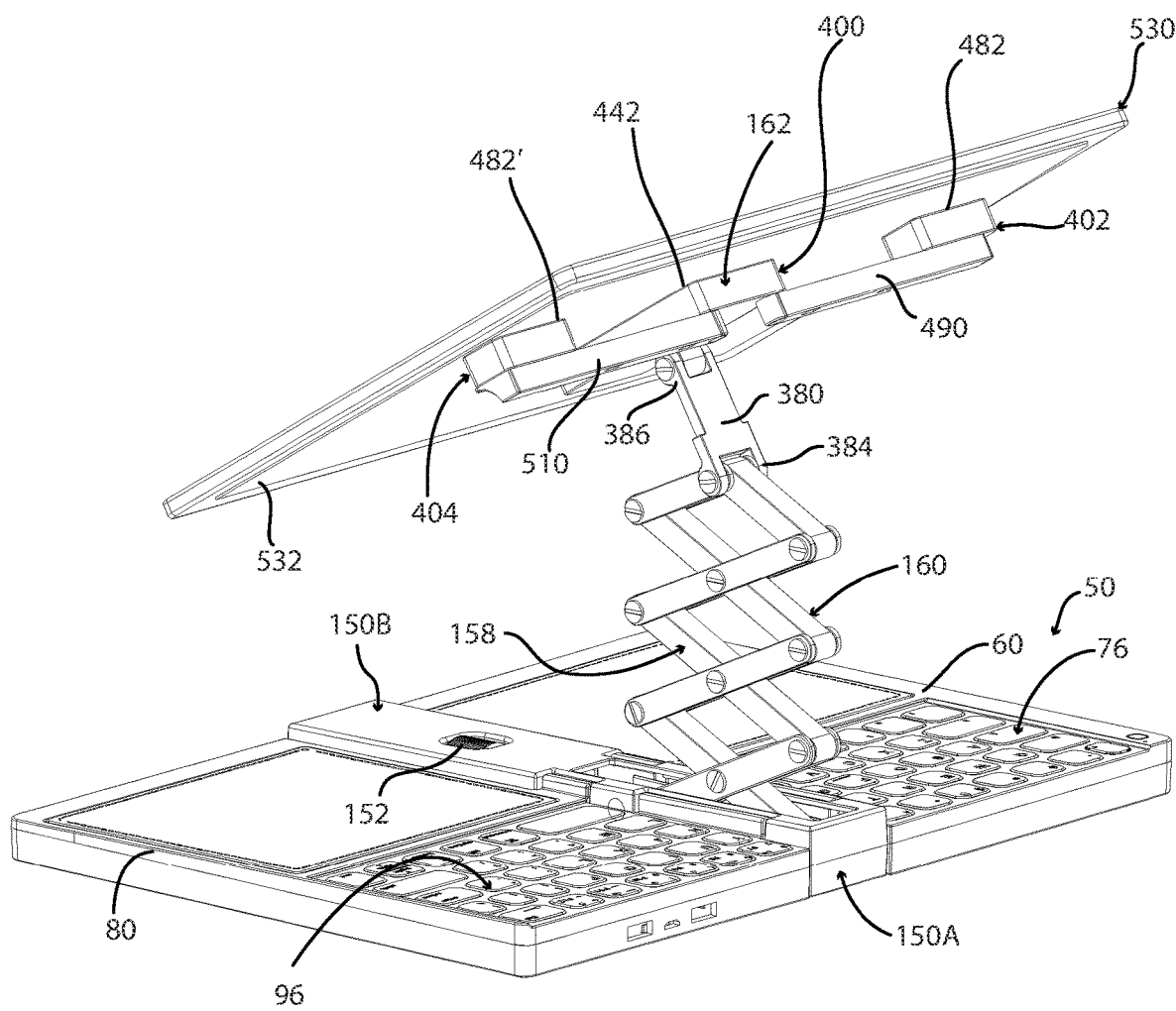
FIG. 36 is a left rear perspective view of the embodiment of FIG. 31, illustrating a tablet computer supported by the stand.
Figure 37:
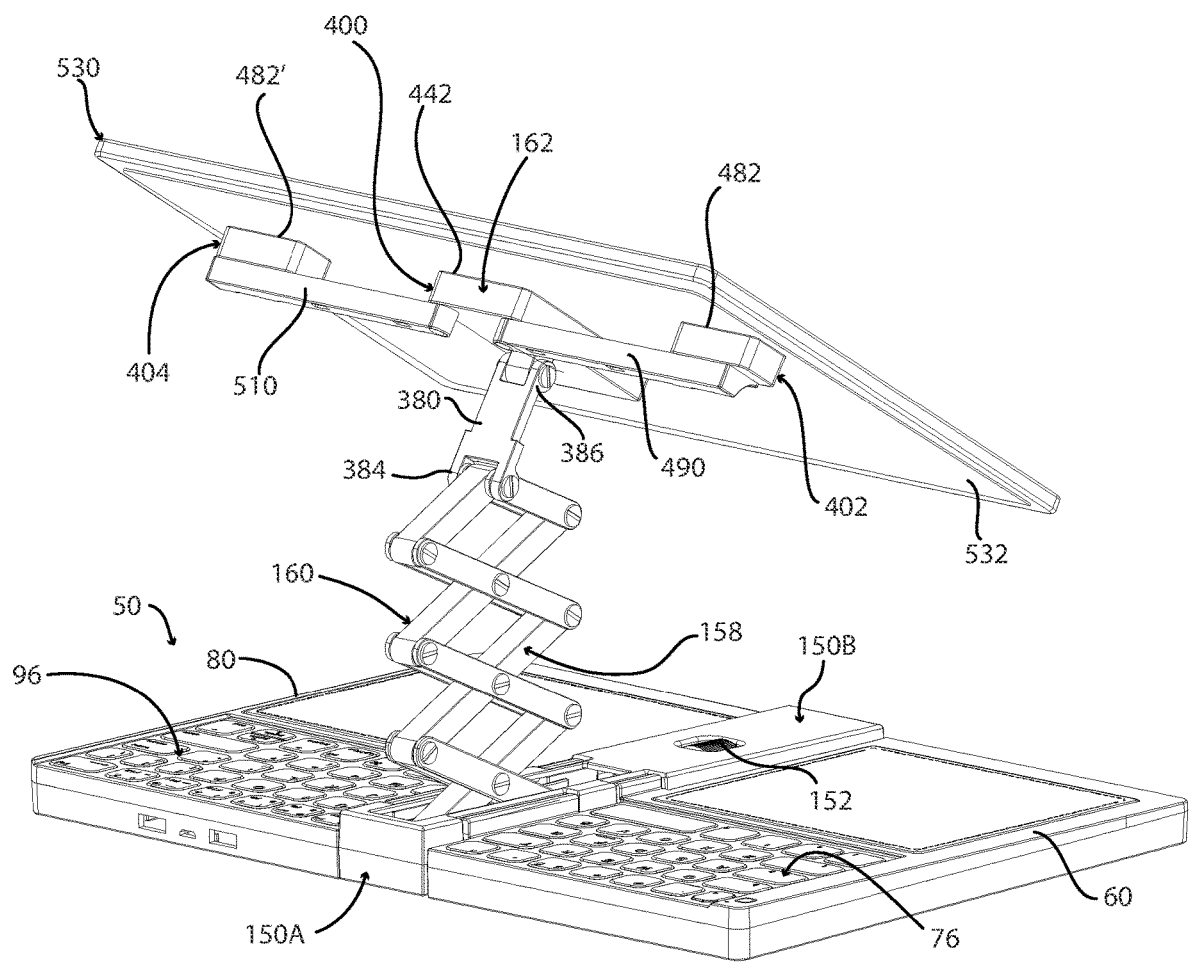
FIG. 37 is a right rear perspective view of the embodiment of FIG. 36.

FIGS. 31 and 32 illustrate the apparatus 50 with the keyboard component 60 and 80 in their operative positions and the scissor mechanism 160 retracted, lowering the holder 162 over the keyboard 52, and the holder 162 expanded, the arms 490 and 510 deployed by hand to their deployed positions supporting the second and third supports 402 and 404 in their deployed positions, spaced laterally outboard of the first support's 400 respective left and right sides 416 and 418, locating the second support 402 over the keys 76 of the keyboard component 60 and locating the third support 404 over the keys 96 of the keyboard component 80. Spacing or otherwise expanding the second and third supports 402 and 404 laterally outboard of the first support's 400 respective sides 416 and 418 enable them to secure the plate 532 magnetically in FIGS. 36 and 37 and support the tablet computer 530 on either side of the first support 402, supporting the tablet computer 530 stably by the first, second and third supports 400, 402 and 403, disabling the tablet computer 530 from tipping to the left or to the right by the first and second supports 402 and 404.

During periods of nonuse and when a user wishes to store the apparatus 50, he may selectively adjust the keyboard components 60 and 80 from their in-use or operative positions to their respective stored positions folded inwardly on either side of the stand 158. The keyboard components 60 and 80 in their stored positions, shown in FIGS. 9-16 in relevant part, concurrently extend upright on either side of the stand 158 from the housing's 150 respective right and left sides 68 and 86 to their respective left and right sides 66 and 88, the linkage 160 shown retracted to the lowered position of the holder 162 shown collapsed extending outward beyond the left and right sides 68 and 88 from between the respective keyboard components 60 and 80. When the keyboard components 60 and 80 are in their stored positions, their respective wrist rests 74 and 94 and keys 76 and 96 face inwardly on either side of the stand 158.

As previously explained in reference to FIGS. 17 and 18, rotation of the shank 248 in opposite directions relative to the pin 250 reciprocates the pin 250 and the support's 350 lower end 352 relative to the support's 360 lower end 362, extending and retracting the scissor mechanism 160 for raising and lowering the holder 162, selective actuation of the trigger 152 activates the power drive mechanism's 154 motor 242 automatically, rotating the shank 248 in opposite directions, and the trigger 152 is a standard rotary switch, wherein the motor 242 activates, rotating the drive shaft 244 and its connected shank 248 clockwise when a user rotates the trigger 152 clockwise, indicated by arrow E, and counterclockwise when a user rotates the trigger 152 counterclockwise, indicated by arrow F. In alternate embodiments, other suitable and readily-available two-way or toggle switch platforms can be used for the trigger 152. Further, while clockwise rotation of the shank 248 imparts corresponding movement of the pin 250 and the support's 350 lower end 352 toward the support's 360 lower end 362 and counterclockwise rotation of the shank 248 imparts corresponding movement of the pin 250 and the support's 350 lower end 352 away from the support's 360 lower end 362, this can be reversed.

When the arms 490 and 510 are in their stored positions in FIGS. 1 and 2, the second and third supports 402 and 404 are in their stored positions juxtaposed with one another and the first support's 400 front end 420 and extending forward from the first support's 400 front end 420 toward the housing's 150 front end 182. When the arms 490 and 510 are in their deployed positions in FIGS. 31 and 32, arm 490 extends laterally outward from its inner end 492 hinged to the first support 400 adjacent to its left side 416 and proximate to its rear end 422 to the arm's 490 outer or free end 494 supporting second support 402 spaced laterally outboard of the first support's 402 left side 416, and arm 510 extends laterally outward from its inner end 512 hinged to the first support 400 adjacent to its right side 418 proximate to its rear end 422 to the arm's 510 outer or free end 514 supporting the third support 404 spaced laterally outboard of the first support's 402 right side 416. In alternate embodiments, the arms 490 may be hinged to the block 410 such that the second and third supports 402 and 404 are in their stored positions juxtaposed with one another and the first support's 400 rear end 422 and extend rearward from the first support's 400 rear end 422 toward the housing's 150 rear end 184 when the second and third supports 402 are in their stored positions. In addition, the arm 490 may extend laterally outward from its inner end 492 hinged to the first support 400 adjacent to its left side 416 proximate to its front end 420 to the arm's 490 outer or free end 494 supporting the second support 402 spaced laterally outboard of the first support's 402 left side 416, and arm 510 may extend laterally outward from its inner end 512 hinged to the first support 400 adjacent to its right side 418 proximate to its front end 420 to the arm's 510 outer or free end 514 supporting third support 404 spaced laterally outboard of the first support's 402 right side 416.

The present invention is described above with reference to illustrative embodiments. Those skilled in the art will recognize that changes and modifications may be made in the described embodiments without departing from the scope of the present invention. Various changes and modifications to the embodiments herein chosen for purposes of illustration will readily occur to those skilled in the art. To the extent that such modifications and variations do not depart from the invention, they are intended to be included within the scope thereof.

The invention claimed is:

1. A peripheral keyboard and stand apparatus for a tablet computer, comprising:
 a keyboard configured with a trigger and a power drive mechanism;
 a linkage coupled between a tablet computer holder and the keyboard; and
 the power drive mechanism coupled operatively between the trigger and the linkage, wherein selective actuation of the trigger automatically activates the power drive mechanism, extending and retracting the linkage for raising and lowering the tablet computer holder relative to the keyboard,
 wherein the tablet computer holder comprises:
 a first support mounted to the linkage, the first support including a first side, a second side, a first end, and a second end, the first side and the second side of the first support extending between the first end and the second end;
 a second support carried by a first arm mounted rotatably to the first support for movement between a stored position of the second support juxtaposed with and outboard of one of the first end and the second end of the first support and a deployed position of the second support outboard of the first side of the first support; and
 a third support carried by a second arm mounted rotatably to the first support for movement between a stored position of the third support juxtaposed with the first support and a deployed position of the third support outboard of the second side of the first support.

2. The peripheral keyboard and stand apparatus according to claim 1, wherein the keyboard comprises a wireless keyboard.

3. The peripheral keyboard and stand apparatus according to claim 1, the keyboard comprising a first keyboard component, a second keyboard component, and a housing, the first keyboard component and the second keyboard component mounted to the housing, separating the first keyboard component from the second keyboard component.

4. The peripheral keyboard and stand apparatus according to claim 3, further comprising the first keyboard component mounted to the housing for movement between an operative position, in which the first keyboard component extends outward laterally from a first side of the housing, and a stored position, in which the first keyboard component extends upright from the first side of the housing and is juxtaposed with the linkage.

5. The peripheral keyboard and stand apparatus according to claim 3, further comprising the second keyboard component mounted to the housing for movement between an operative position, in which the second keyboard component extends outward laterally from a second side of the housing, and a stored position, in which the second keyboard component extends upright from the second side of the housing and is juxtaposed with the linkage.

6. The peripheral keyboard and stand apparatus according to claim 1, wherein the second support and the third support are identical.

7. The peripheral keyboard and stand apparatus according to claim 1, further comprising the first support, the second support, and the third support each configured to secure a tablet computer magnetically.

8. The peripheral keyboard and stand apparatus according to claim 1, further comprising the first support mounted to the linkage rotatably.

9. The peripheral keyboard and stand apparatus according to claim 1, further comprising:
the first support including a first end and a second end, the first side and the second side of the first support extending between the first end and the second end; and
the third support juxtaposed with and outboard of one of the first end and the second end of the first support when the third support is in the stored position thereof.

10. The peripheral keyboard and stand apparatus according to claim 1, further comprising:
the first support including a first end and a second end, the first side and the second side of the first support extending between the first end and the second end;
the second support juxtaposed with and outboard of one of the first end and the second end of the first support when the second support is in the stored position thereof;
the third support juxtaposed with and outboard of the one of the first end and the second end of the first support when the third support is in the stored position thereof; and
the second support is beside the third support when the second support is in the stored position thereof and the third support is in the stored position thereof.

11. A peripheral keyboard and stand apparatus for a tablet computer, comprising:
a keyboard, the keyboard including a housing configured with a trigger and a power drive mechanism;
a scissor mechanism coupled between a tablet computer holder and the housing; and
the power drive mechanism coupled operatively between the trigger and the scissor mechanism, wherein selective actuation of the trigger automatically activates the power drive mechanism, extending and retracting the scissor mechanism for raising and lowering the tablet computer holder relative to the keyboard,
wherein the tablet computer holder comprises:
a first support mounted to the scissor mechanism, the first support including a first side, a second side, a first end, and a second end, the first side and the second side of the first support extending between the first end and the second end;
a second support carried by a first arm mounted rotatably to the first support for movement between a stored position of the second support juxtaposed with and outboard of one of the first end and the second end of the first support and a deployed position of the second support outboard of the first side of the first support; and
a third support carried by a second arm mounted rotatably to the first support for movement between a stored position of the third support juxtaposed with the first support and a deployed position of the third support outboard of the second side of the first support.

12. The peripheral keyboard and stand apparatus according to claim 11 wherein the keyboard comprises a wireless keyboard.

13. The peripheral keyboard and stand apparatus according to claim 11, further comprising:
the scissor mechanism comprising a first scissor support and a second scissor support, the first scissor support including a first lower end mounted to the housing at a fixed position and the second scissor support including a second lower end mounted to the housing for reciprocal movement relative to the first lower end; and
the power drive mechanism coupled operatively between the trigger and the second lower end, wherein the selective actuation of the trigger automatically activates the power drive mechanism, reciprocating the second lower end relative to the first lower end extending and retracting the scissor mechanism.

14. The peripheral keyboard and stand apparatus according to claim 13, further comprising:
a shank mounted to the housing rotatably and including an external thread;
the second lower end comprising a pin including an internal thread threaded on the external thread, wherein rotation of the shank in opposite directions relative to the pin reciprocates the pin relative to the first lower end; and
the shank coupled drivenly to the power drive mechanism, coupling the power drive mechanism operatively between the trigger and the second lower end, wherein the selective actuation of the trigger automatically activates the power drive mechanism, rotating the shank in opposite directions.

15. The peripheral keyboard and stand apparatus according to claim 14, the housing including a slot extending between a first end wall and a second end wall, the pin reciprocates through the slot between the first end wall and the second end wall in response to rotation of the shank in opposite directions.

16. The peripheral keyboard and stand apparatus according to claim 11, the power drive mechanism comprising an electric motor.

17. The peripheral keyboard and stand apparatus according to claim 11, the keyboard comprising a first keyboard component and a second keyboard component mounted to the housing, separating the first keyboard component from the second keyboard component.

18. The peripheral keyboard and stand apparatus according to claim 17, further comprising the first keyboard component mounted to the housing for movement between an operative position, in which the first keyboard component extends outward laterally from a first side of the housing, and a stored position, in which the first keyboard component extends upright from the first side of the housing and is juxtaposed with the scissor mechanism.

19. The peripheral keyboard and stand apparatus according to claim 17, further comprising the second keyboard component mounted to the housing for movement between an operative position, in which the second keyboard component extends outward laterally from a second side of the housing, and a stored position, in which the second keyboard component extends upright from the second side of the housing and is juxtaposed with the scissor mechanism.

20. The peripheral keyboard and stand apparatus according to claim 11, wherein the second support and the third support are identical.

21. The peripheral keyboard and stand apparatus according to claim 11, further comprising the first support, the second support, and the third support each configured to secure a tablet computer magnetically.

22. The peripheral keyboard and stand apparatus according to claim 11, further comprising the first support mounted to the scissor mechanism by a coupling including a lower end coupled to the scissor mechanism and an upper end coupled to the first support.

23. The peripheral keyboard and stand apparatus according to claim 22, further comprising the lower end coupled rotatably to the scissor mechanism.

24. The peripheral keyboard and stand apparatus according to claim 22, further comprising the upper end coupled rotatably to the first support.

25. The peripheral keyboard and stand apparatus according to claim 11, further comprising:
the first support including a first end and a second end, the first side and the second side of the first support extending between the first end and the second end; and
the third support juxtaposed with and outboard of one of the first end and the second end of the first support when the third support is in the stored position thereof.

26. The peripheral keyboard and stand apparatus according to claim 11, further comprising:
the first support including a first end and a second end, the first side and the second side of the first support extending between the first end and the second end;
the second support juxtaposed with and outboard of one of the first end and the second end of the first support when the second support is in the stored position thereof;
the third support juxtaposed with and outboard of the one of the first end and the second end of the first support when the third support is in the stored position thereof; and
the second support is beside the third support when the second support is in the stored position thereof and the third support is in the stored position thereof.

\* \* \* \* \*